(12) United States Patent
Kim et al.

(10) Patent No.: US 11,907,031 B2
(45) Date of Patent: Feb. 20, 2024

(54) DISPLAY DEVICE AND ELECTRONIC DEVICE INCLUDING THE SAME

(71) Applicant: Samsung Display Co., Ltd., Yongin-si (KR)

(72) Inventors: Hun-Tae Kim, Seoul (KR); Jinhyoung Kim, Seoul (KR); Dongho Yoon, Anyang-si (KR); Gyumdong Bae, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/669,780

(22) Filed: Feb. 11, 2022

(65) Prior Publication Data

US 2022/0374058 A1 Nov. 24, 2022

(30) Foreign Application Priority Data

May 21, 2021 (KR) .................. 10-2021-0065758
Jun. 9, 2021 (KR) .................. 10-2021-0074515

(51) Int. Cl.
*G06F 1/16* (2006.01)
*G06F 1/20* (2006.01)

(52) U.S. Cl.
CPC ............ *G06F 1/203* (2013.01); *G06F 1/1652* (2013.01)

(58) Field of Classification Search
CPC ...... G06F 1/203; G06F 1/1652; G06F 1/1637; G06F 1/1681; G06F 1/1686
See application file for complete search history.

(56) References Cited

U.S. PATENT DOCUMENTS

| | | | |
|---|---|---|---|
| 9,781,826 B2 | 10/2017 | Jeong et al. | |
| 10,345,856 B2* | 7/2019 | Song | H10K 59/40 |
| 10,930,883 B2 | 2/2021 | Park | |
| 11,127,931 B2 | 9/2021 | Yoo et al. | |
| 11,175,696 B2* | 11/2021 | Cho | G06F 1/1641 |
| 11,350,531 B2* | 5/2022 | Han | B32B 9/045 |
| 11,406,044 B2* | 8/2022 | Wu | G09F 9/301 |
| 2016/0209874 A1* | 7/2016 | Choi | G06F 1/1652 |
| 2018/0343756 A1* | 11/2018 | Lin | H05K 5/0017 |

(Continued)

FOREIGN PATENT DOCUMENTS

| | | |
|---|---|---|
| KR | 1020160088519 A | 7/2016 |
| KR | 1020190124844 A | 11/2019 |

(Continued)

*Primary Examiner* — Abhishek M Rathod
(74) *Attorney, Agent, or Firm* — CANTOR COLBURN LLP

(57) ABSTRACT

A display device includes a display module including a first non-folding region, a folding region, and a second non-folding region arranged in a first direction, a first support plate disposed on the display module, a second support plate disposed on the first support plate, a heat dissipation layer disposed between the first and second support plates, and including a bending portion overlapping the folding region, a first adhesive layer disposed between the first support plate and the heat dissipation layer, and a second adhesive layer disposed between the second support plate and the heat dissipation layer. An opening defined in each of the first and second adhesive layers has a width greater than a width of the bending portion of the heat dissipation layer in a portion overlapping the folding region.

24 Claims, 17 Drawing Sheets

(56) References Cited

U.S. PATENT DOCUMENTS

| | | | |
|---|---|---|---|
| 2019/0334114 A1* | 10/2019 | Park | G06F 1/203 |
| 2019/0346887 A1* | 11/2019 | Park | G06F 1/1652 |
| 2019/0377383 A1* | 12/2019 | Kim | G06F 1/1643 |
| 2020/0019212 A1* | 1/2020 | Jung | G06F 1/1652 |
| 2020/0022267 A1 | 1/2020 | Han et al. | |
| 2020/0057471 A1* | 2/2020 | Nam | G06F 1/1641 |
| 2020/0134278 A1* | 4/2020 | Lee | G06F 1/203 |
| 2020/0209998 A1* | 7/2020 | Shin | G06F 3/044 |
| 2020/0245501 A1 | 7/2020 | Wu et al. | |
| 2020/0259115 A1* | 8/2020 | Shin | H10K 50/844 |
| 2020/0260596 A1* | 8/2020 | Park | B32B 3/04 |
| 2020/0344897 A1 | 10/2020 | Kim | |
| 2021/0109566 A1* | 4/2021 | Myeong | G06F 1/1681 |
| 2021/0118337 A1* | 4/2021 | Park | G06F 1/1652 |
| 2021/0141124 A1* | 5/2021 | Park | G09F 9/301 |
| 2021/0168953 A1* | 6/2021 | Lee | H04M 1/0216 |
| 2022/0061168 A1* | 2/2022 | Shin | G06F 1/1652 |

FOREIGN PATENT DOCUMENTS

| | | |
|---|---|---|
| KR | 1020200006646 A | 1/2020 |
| KR | 1020200036994 A | 4/2020 |
| KR | 1020200124794 A | 11/2020 |
| KR | 1020210056484 A | 5/2021 |

\* cited by examiner

DISPLAY DEVICE AND ELECTRONIC DEVICE INCLUDING THE SAME

This application claims priority to Korean Patent Application No. 10-2021-0065758, filed on May 21, 2021, and Korean Patent Application No. 10-2021-0074515, filed on Jun. 9, 2021, and all the benefits accruing therefrom under 35 U.S.C. § 119, the content of which in their entirety is herein incorporated by reference.

BACKGROUND

1. Field

Embodiments of the invention herein relate to a display device and an electronic device including the display device.

2. Description of the Related Art

In general, a display device includes a display module for displaying an image and a support portion for supporting the display module. The display module includes a display panel which displays an image, a window disposed on the display panel to protect the display panel from external scratches and impact, and a protection layer disposed under the display panel to protect the display panel from external impact. The support portion is more rigid than the display module, and supports the display module.

With a recent technology development of display devices, flexible display devices which may be transformed into various shapes are being developed. A flexible display device includes a flexible display module which may be folded or rolled. In the flexible display module, a support portion disposed under the display module foldable around a folding axis has a structure of being folded together with the display module.

SUMMARY

Embodiments of the invention herein provide a display device which may improve heat dissipation performance and may be more easily folded together with a display module.

An embodiment of the invention provides a display device including a display module including a first non-folding region, a folding region, and a second non-folding region arranged in a first direction, a first support plate disposed on the display module, a second support plate disposed on the first support plate, a heat dissipation layer disposed between the first and second support plates, and including a bending portion overlapping the folding region, a first adhesive layer disposed between the first support plate and the heat dissipation layer, and a second adhesive layer disposed between the second support plate and the heat dissipation layer, where an opening defined in each of the first and second adhesive layers may have a width greater than a width of the bending portion of the heat dissipation layer in a portion overlapping the folding region.

In an embodiment of the invention, a display device includes a display module including a first non-folding region, a folding region, and a second non-folding region arranged in a first direction, a first support plate disposed on the display module, a second support plate disposed on the first support plate, a heat dissipation layer disposed between the first and second support plates, a first adhesive layer disposed between the first support plate and the heat dissipation layer, and defining an open portion overlapping the folding region, a second adhesive layer disposed between the second support plate and the heat dissipation layer, and defining an open portion overlapping the folding region, and a first step compensation layer overlapping the folding region, and disposed between the heat dissipation layer and the first support plate in a portion in which the first adhesive layer is open.

In an embodiment of the invention, an electronic device includes a display device in which a first hole region through which an optical signal passes is defined, an electronic optical module which is disposed on the display device, overlaps the first hole region, and receives the optical signal, and a case for receiving the display device and the electronic optical module, where the display device includes a display module including a first non-folding region, a folding region, and a second non-folding region arranged in a first direction, a first support plate disposed on the display module, a second support plate disposed on the first support plate, a heat dissipation layer disposed between the first and second support plates, and including a bending portion overlapping the folding region, a first adhesive layer disposed between the first support plate and the heat dissipation layer, and a second adhesive layer disposed between the second support plate and the heat dissipation layer, where an opening defined in each of the first and second adhesive layers may have a width greater than a width of the bending portion of the heat dissipation layer in a portion overlapping the folding region.

In an embodiment of the invention, an electronic device includes a display device in which a first hole region through which an optical signal passes is defined, an electronic optical module which is disposed on the display device, overlaps the first hole region, and receives the optical signal, and a case for receiving the display device and the electronic optical module, where the display device includes a display module including a first non-folding region, a folding region, and a second non-folding region arranged in a first direction, a first support plate disposed on the display module, a second support plate disposed on the first support plate, a heat dissipation layer disposed between the first and second support plates, a first adhesive layer disposed between the first support plate and the heat dissipation layer, and defining an open portion overlapping the folding region, a second adhesive layer disposed between the second support plate and the heat dissipation layer, and defining an open portion overlapping the folding region, and a first step compensation layer overlapping the folding region, and disposed between the heat dissipation layer and the first support plate in a portion in which the first adhesive layer is open.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1:
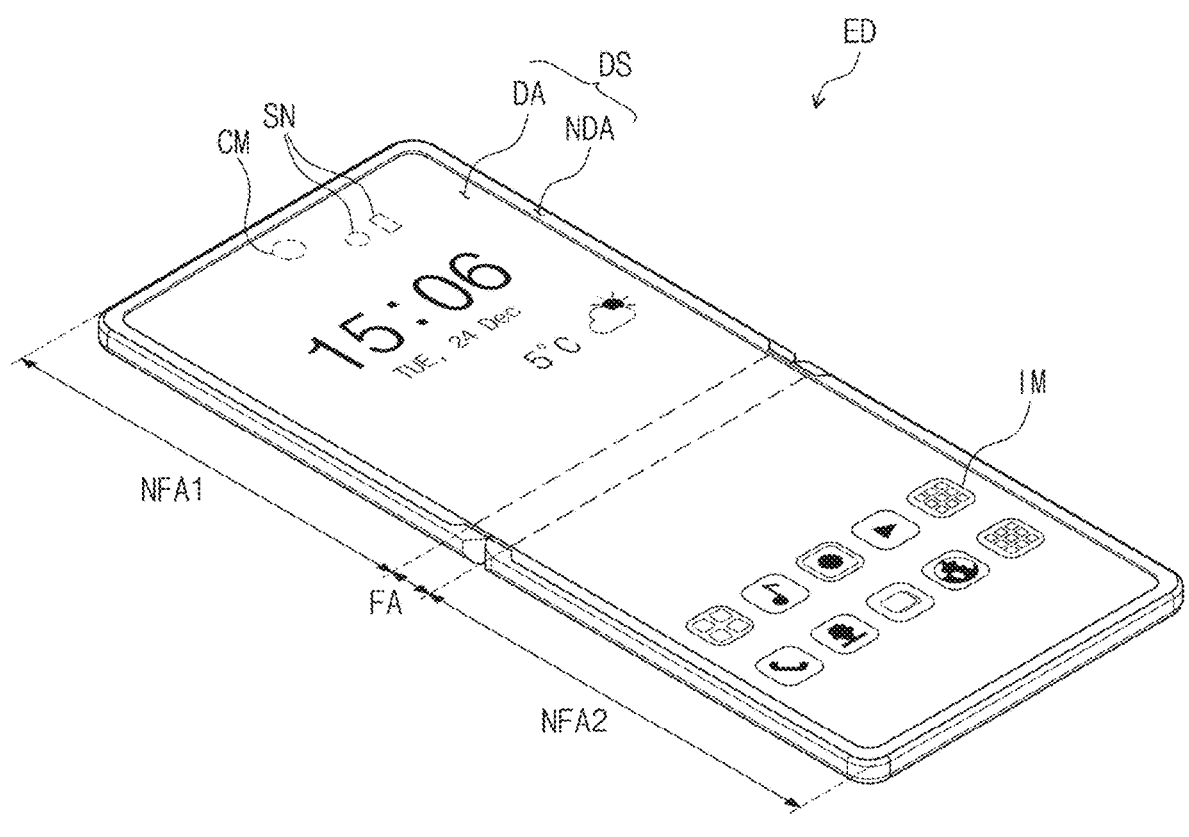
FIG. 1 is a perspective view of an embodiment of an electronic device according to the invention.

In the disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or" includes any and all combinations of one or more of which associated elements may define.

It will be understood that, although the terms "first", "second", etc. may be used herein to describe various elements, these elements should not be limited by these terms. These terms are only used to distinguish one element from another. A first element may be referred to as a second element, and a second element may also be referred to as a first element in a similar manner without departing the scope of rights of the invention, for example. The terms of a singular form may include plural forms unless the context clearly indicates otherwise.

In addition, terms such as "below," "lower," "above," "upper," and the like are used to describe the relationship of components shown in the drawings. The terms are used as a relative concept and are described with reference to the direction indicated in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which the invention pertains. It is also to be understood that terms defined in commonly used dictionaries should be interpreted as having meanings consistent with the meanings in the context of the related art, and are expressly defined herein unless they are interpreted in an ideal or overly formal sense. In the description, the term "module" may mean a hardware component such as a circuit, for example.

It should be understood that the terms "comprise", or "have" are intended to specify the presence of stated features, integers, steps, operations, elements, components, or combinations thereof in the invention, but do not preclude the presence or addition of one or more other features, integers, steps, operations, elements, components, or combinations thereof.

Hereinafter, embodiments of the invention will be described with reference to the accompanying drawings.

Figure 2:
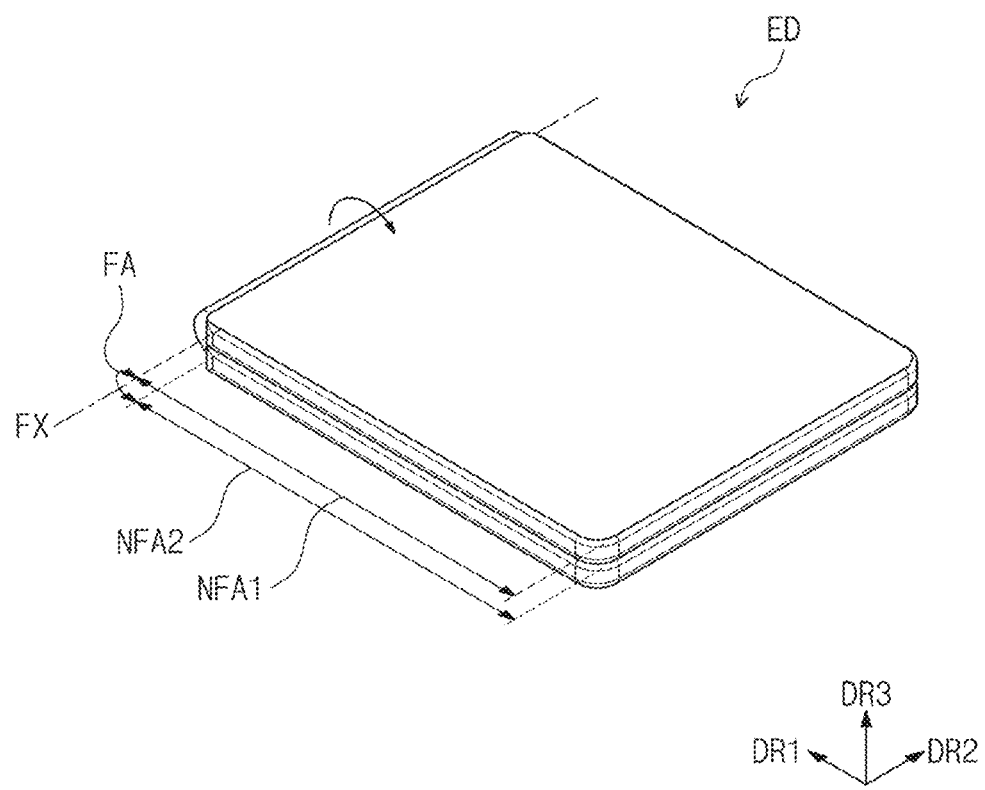
FIG. 2 is a view illustrating the electronic device illustrated in FIG. 1 in a folded state.

FIG. 1 is a perspective view of an embodiment of an electronic device according to the invention. FIG. 2 is a view illustrating the electronic device illustrated in FIG. 1 in a folded state.

Referring to FIG. 1, an electronic device ED in an embodiment of the invention may have a quadrangular (e.g., rectangular) shape which includes long sides extending in a first direction DR1 and includes short sides extending in a second direction DR2 crossing the first direction DR1. However, the invention is not limited thereto. In another embodiment, the electronic device ED may have various shapes such as a circular shape or a polygonal shape. The electronic device ED may be a flexible electronic device.

Hereinafter, a direction substantially perpendicularly crossing a plane defined by the first direction DR1 and the second direction DR2 is defined as a third direction DR3. In addition, in the disclosure, "in a plan view" may be defined as a state viewed in the third direction DR3. In addition, in the disclosure, "overlap" may refer to a state in which components are arranged overlapping each other in a plan view.

The electronic device ED may include a folding region FA and a plurality of non-folding regions NFA1 and NFA2. The non-folding regions NFA1 and NFA2 may include a first non-folding region NFA1 and a second non-folding region NFA2. The folding region FA may be disposed between the first non-folding region NFA1 and the second non-folding region NFA2. The first non-folding region NFA1, the folding region FA, and the second non-folding region NFA2 may be arranged in the first direction DR1.

In the illustrated embodiment, one folding region FA and two non-folding regions NFA1 and NFA2 are shown. However, the number of the folding region FA and the non-folding regions NFA1 and NFA2 is not limited thereto. In another embodiment, the electronic device ED may include a plurality of non-folding regions, which is more than two, and a plurality of folding regions disposed between non-folding regions, for example.

An upper surface of the electronic device ED may be defined as a display surface DS, and may have a plane defined by the first direction DR1 and the second direction DR2. Images IM generated in the electronic device ED may be provided to a user through the display surface DS.

The display surface DS may include a display region DA and a non-display region NDA around the display region DA. The display region DA may display an image, and the non-display region NDA may not display an image. The non-display region NDA surrounds the display region DA, and may define the edge of the electronic device ED printed in a predetermined color.

The electronic device ED may include a plurality of sensors SN and at least one camera CM. The sensors SN and the camera CM may be adjacent to the edge of electronic device ED. The sensors SN and the camera CM may be disposed in the display region DA adjacent to the non-display region NDA. In an embodiment, the sensors SN and the camera CM may be disposed in the first non-folding region NFA1, but the disposition position of the sensors SN and the camera CM is not limited thereto.

In an embodiment, the sensors SN may be near-illumination sensors, but the type of the sensors SN is not limited thereto. The camera CM may capture an external image.

Referring to FIG. 2, the electronic device ED may be a folding-type (foldable) electronic device ED which is folded or unfolded. In an embodiment, the folding region FA may be bent based on a folding axis FX parallel to the second direction DR2, so that the electronic device ED may be folded, for example. The folding axis FX may be defined as a short axis which is parallel to a short side of the electronic device ED.

In an embodiment, when the electronic device ED is folded, the first non-folding region NFA1 and the second non-folding region NFA2 face each other, and the electronic device ED may be in-folded such that the display surface DS is not exposed to the outside. However, the invention is not limited thereto. In another embodiment, the electronic device ED may be out-folded around the folding axis FX such that the display surface DS is exposed to the outside, for example.

Figure 3:
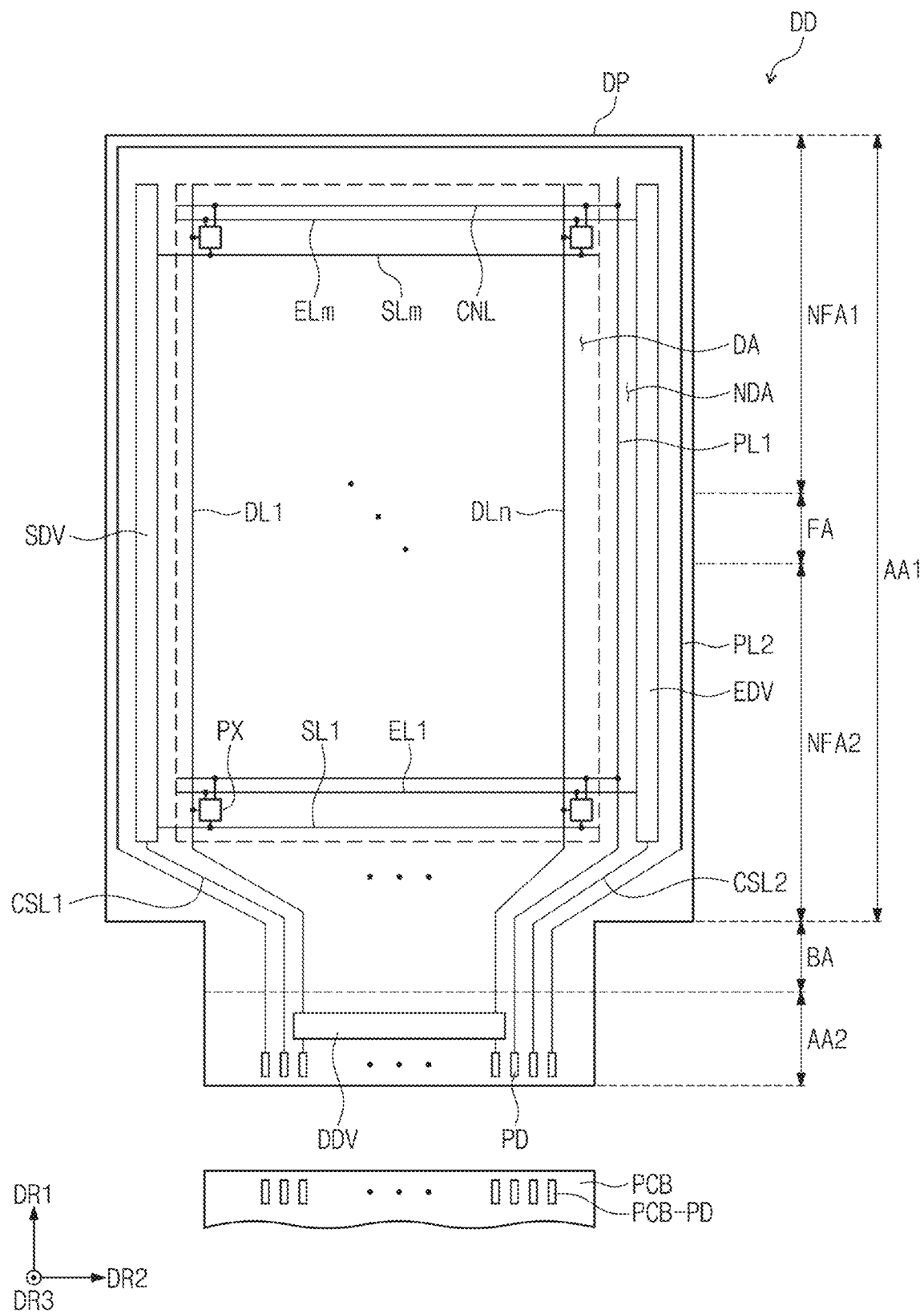
FIG. 3 is a plan view of a display device used in the electronic device illustrated in FIG. 1.

FIG. 3 is a plan view of a display device used in the electronic device illustrated in FIG. 1.

Referring to FIG. 3, the display device DD may include a display panel DP, a scan driver SDV, a data driver DDV, and an emission driver EDV.

The display panel DP in an embodiment of the invention may be a light-emitting type display panel, but is not particularly limited thereto. In an embodiment, the display panel DP may be an organic emission display panel or an inorganic emission display panel, for example. An emission layer of the organic emission display panel may include an organic emission material. An emission layer of the inorganic emission display panel may include a quantum dot, a quantum load, or the like. Hereinafter, the display panel DP will be described as an organic emission display panel.

The display panel DP may be a flexible display panel. In an embodiment, the display panel DP may include a plurality of electronic elements disposed on a flexible substrate, for example. The display panel DP may be extended more in the first direction DR1 than in the second direction DR2. The display panel DP may have a plane defined by the first and second directions DR1 and DR2.

The display panel DP may include a first region AA1, a second region AA2, and a bending region BA disposed between the first region AA1 and the second region AA2. The bending region BA may extend in the second direction DR2, and the first region AA1, the bending region BA, and the second region AA2 may be arranged in the first direction DR1.

The first region AA1 may extend in the first direction DR1, and may include long sides opposite to each other in the second direction DR2. The length of the bending region BA and the length of the second region AA2 may be smaller than the length of the first region AA1 in the second direction DR2.

The first region AA1 may include the display region DA and the non-display region NDA around the display region DA. The non-display region NDA may surround the display region DA. The display region DA may be a region which displays an image, and the non-display region NDA may be a region which does not display an image. The second region AA2 and the bending region BA may be regions which do not display an image.

The first region AA1 may include, when viewed in the second direction DR2, the first non-folding region NFA1, the second non-folding region NFA2, and the folding region FA between the first non-folding region NFA1 and the second non-folding region NFA2.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, a first power line PL1, a second power line PL2, a plurality of connection lines CNL, and a plurality of pads PD. Here, m and n are natural numbers. The pixels PX are disposed in the display region DA, and may be connected to the scan lines SL1 to SLm, the data lines DL1 to DLn, and the light emission lines (also referred to as emission lines) EL1 to ELm.

The scan driver SDV and the emission driver EDV may be disposed in the non-display region NDA. The scan driver SDV and the emission driver EDV may be disposed in the non-display region NDA adjacent to each of the long sides of the first region AA1. The data driver DDV may be disposed in the second region AA2. The data driver DDV may be manufactured in the form of an integrated circuit ("IC") chip and disposed (e.g., mounted) on the second region AA2.

The scan lines SL1 to SLm may be extended in the second direction DR2 and be connected to the scan driver SDV. The data lines DL1 to DLn are extended in the first direction DR1, and may be connected to the data driver DDV via the bending region BA. The light emission lines EL1 to ELm may be extended in the second direction DR2 and be connected to the emission driver (also referred to as a light emission driver) EDV.

The first power line PL1 may be extended in the first direction DR1 and disposed in the non-display region NDA. In an embodiment, the first power line PL1 may be disposed between the display region DA and the emission driver EDV. However, the invention is not limited thereto. In another embodiment, the first power line PL1 may be disposed between the display region DA and the scan driver SDV.

The first power line PL1 may be extended in the second region AA2 via the bending region BA. In a plan view, the first power line PL1 may be extended toward a lower end of the second region AA2. The first power line PL1 may have a first voltage.

The second power line PL2 may be disposed in the non-display region NDA adjacent to the long sides of the first region AA1, and in the non-display region NDA facing the second region AA2 with the display region DA interposed therebetween. The second power line PL2 may be disposed at an outer periphery than the scan driver SDV and the emission driver EDV.

The second power line PL2 may be extended to the second region AA2 via the bending region BA. The second power line PL2 may be extended in the first direction DR1 in the second region AA2 with the data driver DDV interposed therebetween. In a plan view, the second power line PL2 may be extended toward the lower end of the second region AA2.

The second power line PL2 may receive a second voltage having a lower level than that of the first voltage. For convenience of description, the connection relationship is not illustrated. However, the second power line PL2 is extended to the display region DA and connected to the pixels PX, and the second voltage may be provided to the pixels PX through the second power line PL2.

The connection lines CNL may be extended in the second direction DR2 and arranged in the first direction DR1. The connection lines CNL may be connected to the first power line PL1 and the pixels PX. The first voltage may be applied to the pixels PX through the first power line PL1 and the connection lines CNL connected to each other.

The first control line CSL1 is connected to the scan driver SDV, and may be extended toward the lower end of the second region AA2 via the bending region BA. The second control line CSL2 is connected to the emission driver EDV, and may be extended toward the lower end of the second region AA2 via the bending region BA. The data driver DDV may be disposed between the first control line CSL1 and the second control line CSL2.

In a plan view, the pads PD may be disposed adjacent to the lower end of the second region AA2. The data driver DDV, the first power line PL1, the second power line PL2, the first control line CSL1, and the second control line CSL2 may be connected to the pads PD.

The data lines DL1 to DLn may be connected to corresponding pads PD through the data driver DDV. In an embodiment, the data lines DL1 to DLn may be connected to the data driver DDV, and the data driver DDV may be connected to the pads PD respectively corresponding to the data lines DL1 to DLn, for example.

The display device DD may include a printed circuit board PCB connected to the pads PD. Connection pads PCB-PD are disposed on the printed circuit board PCB, and the connection pads PCB-PD may be connected to the pads PD.

On the printed circuit board PCB, a timing controller (not shown) may be disposed. The timing controller may be connected to the pads PD through the printed circuit board. The timing diagram may control the operation of the scan driver SDV, the data driver DDV, and the emission driver EDV. The timing controller may generate a scan control signal, a data control signal, and an emission control signal in response to control signals received from the outside.

The scan control signal may be provided to the scan driver SDV through the first control line CSL1. The emission control signal may be provided to the emission driver EDV through the second control line CSL2. The data control signal may be provided to the data driver DDV. The timing controller receives image signals from the outside, and may convert the data format of the image signals to match interface specifications with the data driver DDV and provide the image signals with converted data format to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding the image signals in response to the data control signal. The data voltages may be applied to the pixels PX through the data lines DL1 to DLn. The emission driver EDV may generate a plurality of emission signals in response to the emission control signal. The emission signals may be applied to the pixels PX through the emission lines EL1 to ELm.

The pixels PX may be provided with the data voltages in response to the scan signals. The pixels PX may display an image by emitting light of luminance corresponding to the data voltages in response to the light emission signals. The light emission duration of the pixels PX may be controlled by the light emission signals.

On the printed circuit board PCB, a voltage generator (not shown) may be disposed. The voltage generator may be connected to the pads PD through the printed circuit board. The voltage generator may generate the first voltage and the second voltage. The first voltage and the second voltage may be respectively applied to the first power line PL1 and the second power line PL2.

Each of the pixels PX may include an organic emission element. The first voltage may be applied to an anode of the organic emission element, and the second voltage may be applied to a cathode of the organic emission element. The organic emission element may be operated by being applied with the first voltage and the second voltage.

Figure 4:
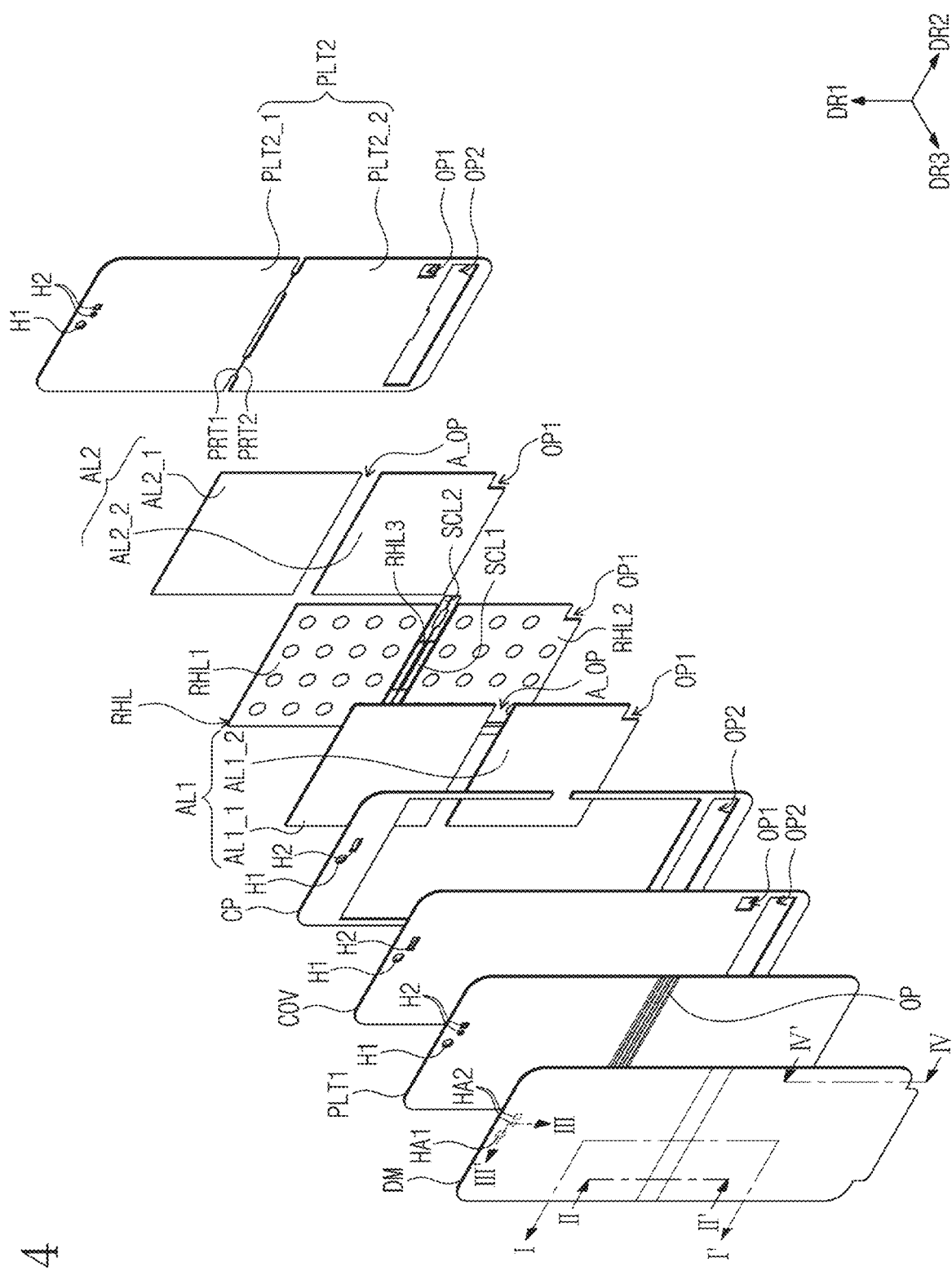
FIG. 4 is an exploded perspective view of a display device used in the electronic device illustrated in FIG. 1.
Figure 5:
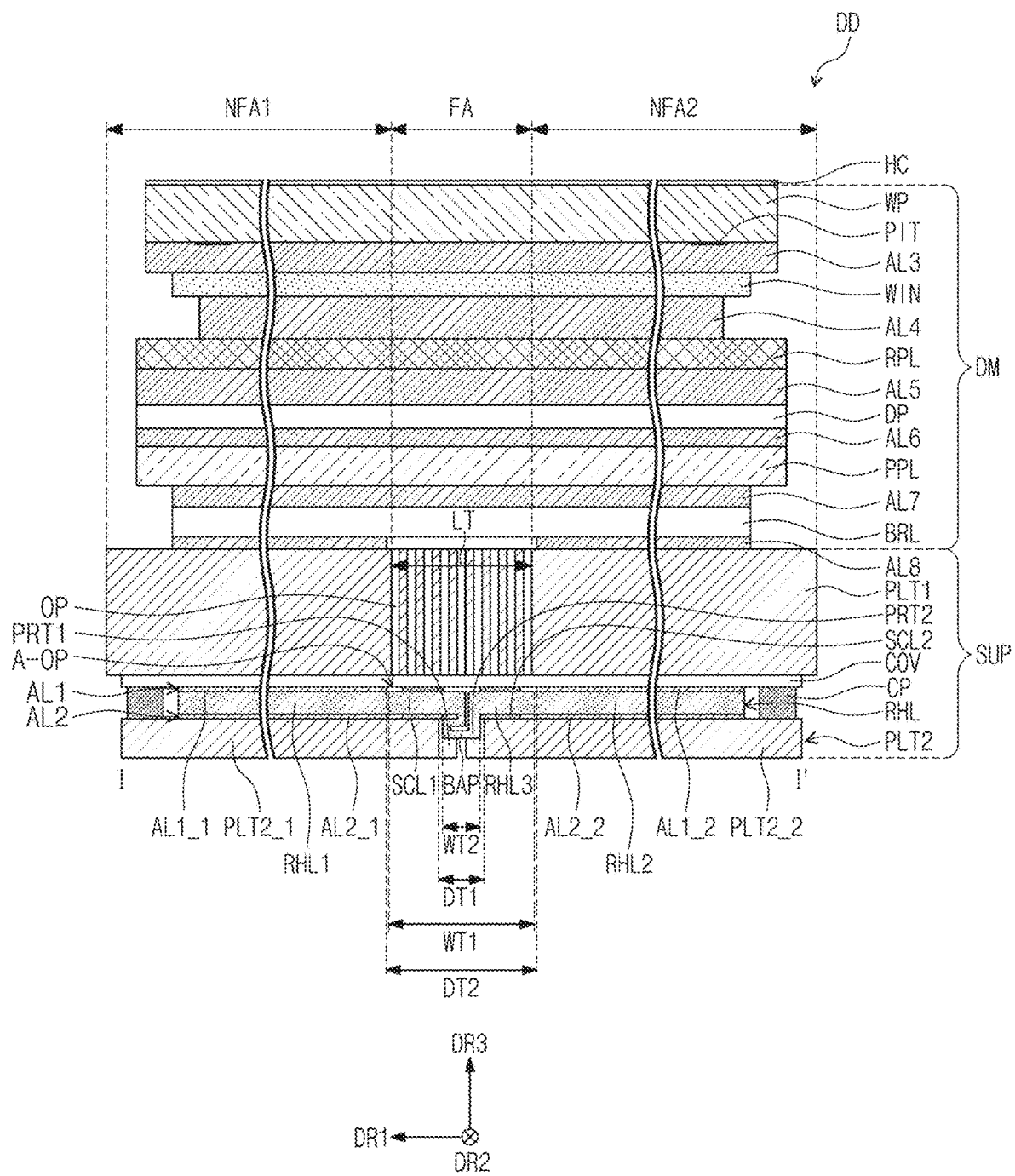
FIG. 5 is a cross-sectional view of line I-I' illustrated in FIG. 4.
Figure 6:
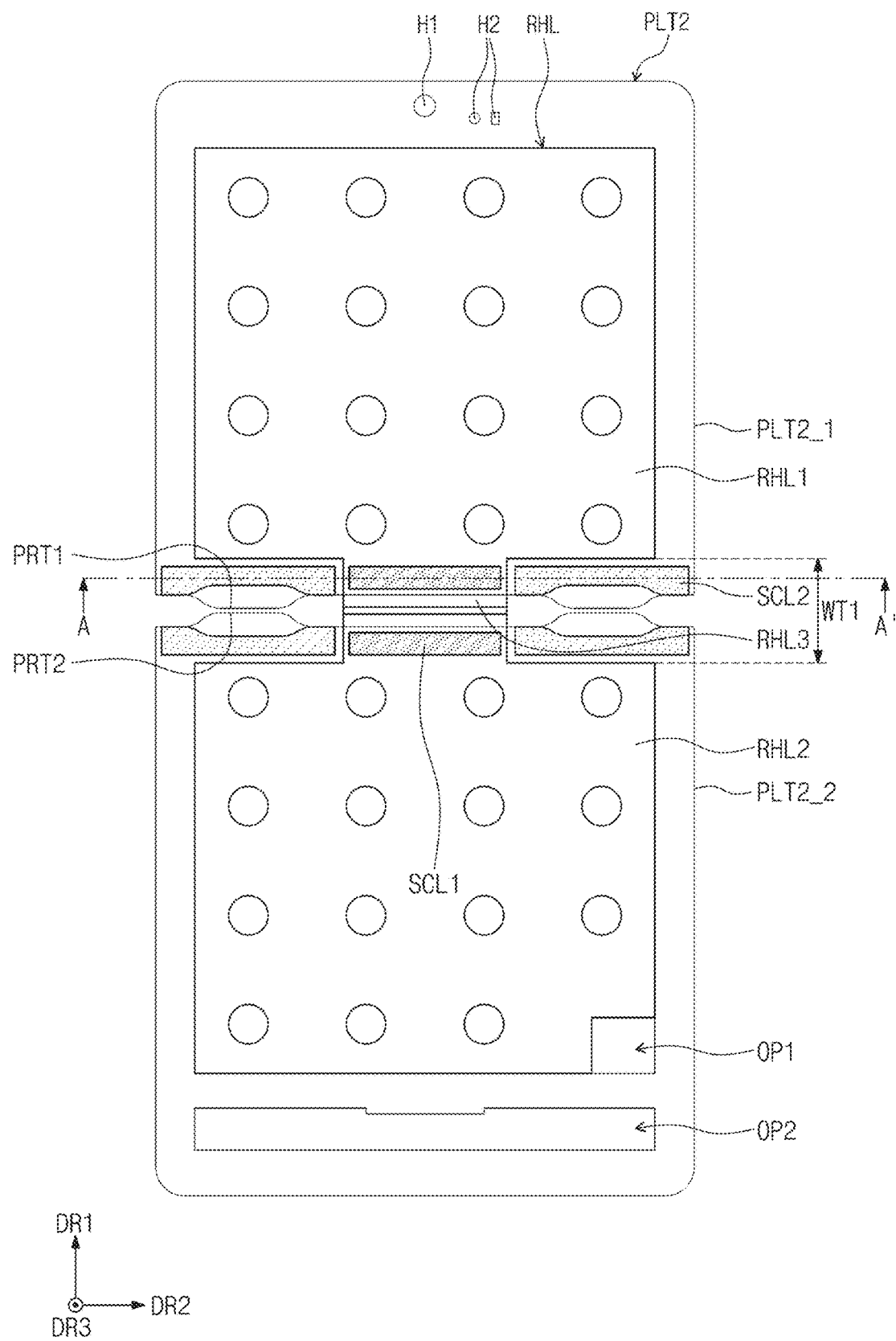
FIG. 6 is a plan view of a heat dissipation layer, a second support plate, and first and second step compensation layers illustrated in FIG. 4.
Figure 7:
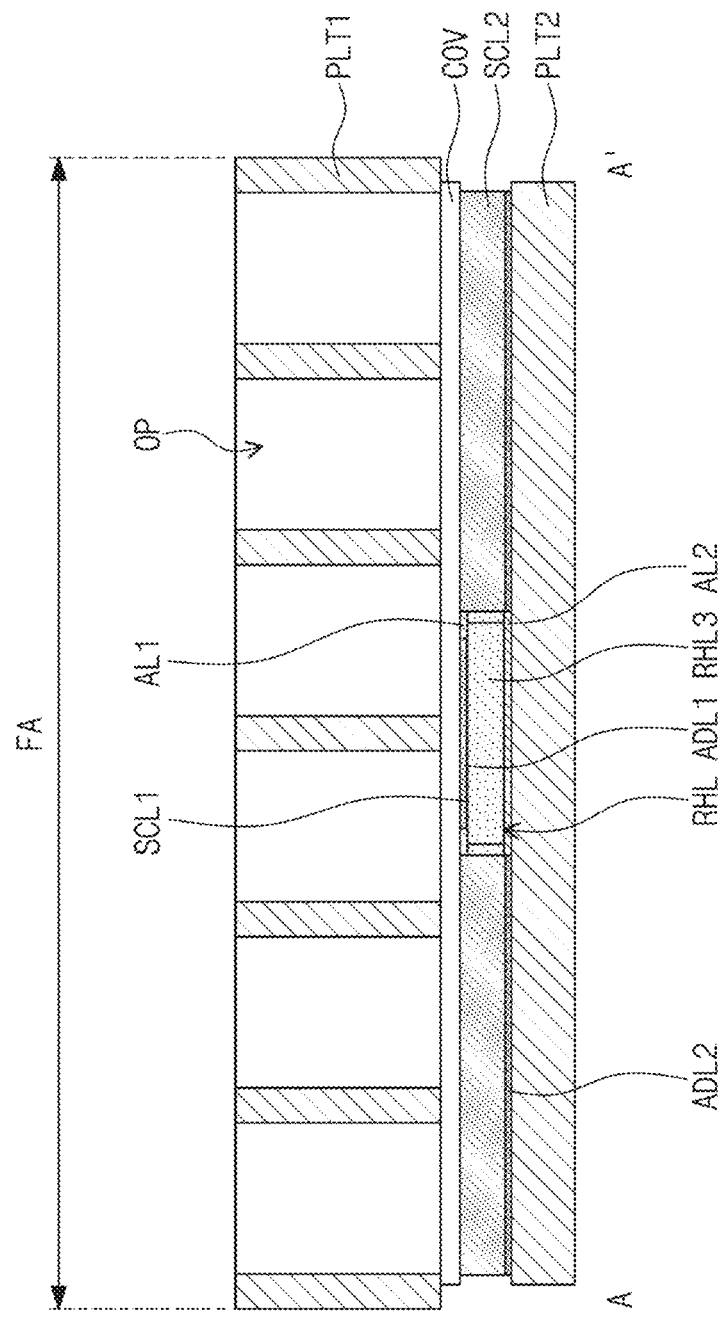
FIG. 7 is a cross-sectional view of line A-A' illustrated in FIG. 6.

FIG. 4 is an exploded perspective view of a display device used in the electronic device illustrated in FIG. 1. FIG. 5 is a cross-sectional view of line I-I' illustrated in FIG. 4. FIG. 6 is a plan view of a heat dissipation layer, a second support plate, and first and second step compensation layers illustrated in FIG. 4. FIG. 7 is a cross-sectional view of line A-A' illustrated in FIG. 6.

Referring to FIG. 4 and FIG. 5, the display device DD in an embodiment of the invention may include a display module DM and a support portion SUP disposed under the display module DM. The display module DM may be a flexible display module. The display module DM may include the first non-folding region NFA1, the folding region FA, and the second non-folding region NFA2 arranged in the first direction DR1.

At least one first hole region HA1 and a plurality of second hole regions HA2 may be defined in the display module DM. The above-described camera CM may be disposed in the first hole region HA1, and the above-described sensors SN may be disposed in the second hole regions HA2.

The support portion SUP may support the display module DM under the display module DM. The support portion SUP may include a first support plate PLT1, a second support plate PLT2, a heat dissipation layer RHL, a first adhesive layer AL1, a second adhesive layer AL2, a step compensation layer CP, a plurality of first step compensation layers SCL1, and a plurality of second step compensation layers SCL2.

The first support plate PLT1 may be disposed under the display module DM to support the display module DM. In an embodiment, the first support plate PLT1 may include a material having an elastic modulus of about 600 gigapascals (GPa) or greater.

The first support plate PLT1 may be more rigid than the display module DM. The first support plate PLT1 may include a metal material such as stainless steel. In an embodiment, the first support plate PLT1 may include SUS 304, for example, but is not limited thereto. In another embodiment, the first support plate PLT1 may include various metal materials. In addition, the first support plate PLT1 is not limited thereto, and may include a non-metal material such as glass or plastic.

In a portion of the first support plate PLT1 overlapping the folding region FA, a plurality of openings OP may be defined. The openings OP may be defined by penetrating portions of the first support plate PLT1 in the third direction DR3.

Since the openings OP are defined in the portion of the first support plate PLT1 overlapping the folding region FA, the flexibility of the portion of the first support plate PLT1 overlapping the folding region FA may increase. As a result, the first support plate PLT1 may be easily foldable around the folding region FA.

A cover layer COV may be disposed under the first support plate PLT1. The cover layer COV may cover the openings OP defined in the first support plate PLT1 under the first support plate PLT1.

The cover layer COV may have an elastic modulus lower than that of the first support plate PLT1. In an embodiment, the cover layer COV may include thermoplastic polyurethane or rubber, for example, but the material of the cover layer COV is not limited thereto. The cover layer COV may be manufactured in a sheet form and attached to the first support plate PLT1.

Under the first support plate PLT1, the second support plate PLT2 may be disposed. The cover layer COV may be disposed between the first support plate PLT1 and the second support plate PLT2. The second support plate PLT2 may be more rigid than the display module DM.

In an embodiment, the second support plate PLT2 may include a metal material such as stainless steel, but the material of the second support plate PLT2 is not limited thereto. In addition, the second support plate PLT2 is not limited thereto, and may include a non-metal material such as glass or plastic.

The second support plate PLT2 may include a 2_1 support plate PLT2_1 overlapping the first non-folding region NFA1 and a 2_2 support plate PLT2_2 overlapping the second non-folding region NFA2. The 2_1 support plate PLT2_1 and the 2_2 support plate PLT2_2 may be spaced apart from each other under the folding region FA.

The heat dissipation layer RHL may be disposed between the first support plate PLT1 and the second support plate PLT2. Specifically, the heat dissipation layer RHL may be disposed between the cover layer COV and the second support plate PLT2. A portion of the heat dissipation layer RHL overlapping the folding region FA may be bent to be disposed between the 2_1 support plate PLT2_1 and the 2_2 support plate PLT2_2.

The heat dissipation layer RHL may perform a heat dissipation function. In an embodiment, the heat dissipation layer RHL may include or consist of graphite, for example, but the material of the heat dissipation layer RHL is not limited thereto. Since the heat dissipation layer RHL performs a heat dissipation performance with the first and second support plates PLT1 and PLT2, the heat dissipation performance of the display device DD may improve.

The heat dissipation layer RHL may have an embossing structure. Although not shown by reference numerals, the circular shapes illustrated in the heat dissipation layer RHL in FIG. 4 and FIG. 6 may represent a convex surface of the heat dissipation layer RHL. When the heat dissipation layer RHL has an embossing structure, the structure of the heat dissipation layer RHL may be extended. When the surface area is extended, heat dissipation performance may be improved.

Referring to FIG. 4, FIG. 5, and FIG. 6, the heat dissipation layer RHL may include a first heat dissipation part RHL1, a second heat dissipation part RHL2, and a third heat dissipation part RHL3 disposed between the first heat dissipation part RHL1 and the second heat dissipation part RHL2. The first heat dissipation part RHL1 may overlap the first non-folding region NFA1, the second heat dissipation part RHL2 may overlap the second non-folding region NFA2, and the third heat dissipation part RHL3 may overlap the folding region FA. As illustrated in FIG. 6, in the second direction DR2, the width of the third heat dissipation part RHL3 may be smaller than the width of each of the first and second heat dissipation parts RHL1 and RHL2.

As illustrated in FIG. 5, a portion of the third heat dissipation part RHL3 may be bent to be disposed between the 2_1 support plate PLT2_1 and the 2_2 support plate PLT2_2. The bending portion of the third heat dissipation part RHL3 may be defined as a bending portion BAP.

In a portion between the two omission marks illustrated in FIG. 5, a horizontal direction may be the first direction DR1. In the first direction DR1, a first distance DT1 between the 2_1 support plate PLT2_1 and the 2_2 support plate PLT2_2 may be smaller than a first width WT1 of the third heat dissipation part RHL3. In the first direction DR1, a second width WT2 of the bending portion BAP may be smaller than the first distance DT1 between the 2_1 support plate PLT2_1 and the 2_2 support plate PLT2_2.

In an embodiment, in the first direction DR1, the first width WT1 of the third heat dissipation part RHL3 may be about 9.65 millimeters, and the second width WT2 of the bending portion BAP may be about 0.6 millimeter. In an embodiment, in the first direction DR1, the first distance DT1 between the 2_1 support plate PLT2_1 and the 2_2 support plate PLT2_2 may be about 1.6 millimeters to about 1.8 millimeters. In an embodiment, in the first direction DR1, a length LT of the portion of the first support plate PLT1 in which the openings OP are defined may be about 8.65 millimeters.

The bending portion BAP may protrude below the first and second heat dissipation parts RHL1 and RHL2 and be disposed between the 2_1 support plate PLT2_1 and the 2_2 support plate PLT2_2. In an embodiment, the bending portion BAP may be bent twice, first in the downward direction and then in the left direction, but the bending shape of the bending portion BAP is not limited thereto. In a state in which the display module DM and the support portion SUP are unfolded, the bending portion BAP may remain bent.

The first heat dissipation part RHL1, the second heat dissipation part RHL2, and the third heat dissipation part RHL3 may be unitary with one another as a single body. When a separable heat dissipation layer is used, the third heat dissipation part RHL3 is not used, but the first heat dissipation part RHL1 and the second heat dissipation part RHL2 separated from each other may be used. However, in an embodiment of the invention, a unitary heat dissipation layer RHL is used, so that the third heat dissipation part RHL3 may be further disposed under the folding region FA. Therefore, the heat dissipation performance of the display device DD may be improved.

The third heat dissipation part RHL3 may be bent and disposed under the folding region FA. Therefore, the area of the heat dissipation layer RHL may be further expanded by the bending portion BAP. Since the heat dissipation performance is proportional to the area of the heat dissipation layer RHL, the heat dissipation performance of the display device DD may be improved.

In a region overlapping the first and the second heat dissipation parts RHL1 and RHL2, the 2_1 support plate PLT2_1 may include first protrusion portions PRT1 protruding in the first direction DR1, and the 2_2 support plate PLT2_2 may include second protrusion portions PRT2 protruding in the first direction DR1. The first protrusion portions PRT1 and the second protrusion portions PRT2 may protrude toward each other.

In accordance with the structure, in the region overlapping the first and the second heat dissipation parts RHL1 and RHL2, the 2_1 support plate PLT2_1 and the 2_2 support plate PLT2_2 are disposed adjacent to each other, and thus, may more easily support the second step compensation layers SCL2. In a region overlapping the third heat dissipation part RHL3, spacing between the 2_1 support plate PLT2_1 and the 2_2 support plate PLT2_2 may be larger than spacing between the first protrusion portions PRT1 and the second protrusion portions PRT2.

The first adhesive layer AL1 may be disposed between the first support plate PLT1 and the heat dissipation layer RHL. Specifically, the first adhesive layer AL1 is disposed between the cover layer COV and the heat dissipation layer RHL, and the cover layer COV may be disposed between the first support plate PLT1 and the first adhesive layer AL1. A portion of the first adhesive layer AL1 overlapping the folding region FA may be open. That is, the first adhesive layer AL1 may not be disposed under the folding region FA.

The first adhesive layer AL1 may include a 1_1 adhesive layer AL1_1 overlapping the first non-folding region NFA1 and a 1_2 adhesive layer AL1_2 overlapping the second non-folding region NFA2. The 1_2 adhesive layer AL1_2 may be spaced apart from the 1_1 adhesive layer AL1_1.

In the first direction DR1, a second distance DT2 between the 1_1 adhesive layer AL1_1 and the 1_2 adhesive layer AL1_2 may be larger than the length LT of the portion of the first support plate PLT1 in which the openings OP are defined. In the first direction DR1, the second distance DT2 between the 1_1 adhesive layer AL1_1 and the 1_2 adhesive layer AL1_2 may be larger than the first width WT1 of the third heat dissipation part RHL3.

The 1_1 adhesive layer AL1_1 and the 1_2 adhesive layer AL1_2 may not overlap the folding region FA. A region between the 1_1 adhesive layer AL1_1 and the 1_2 adhesive layer AL1_2 may be defined as the open portion of the first adhesive layer AL1. The 1_1 adhesive layer AL1_1 and the 1_2 adhesive layer AL1_2 may substantially have the same shape as that of the first heat dissipation part RHL1 and the second heat dissipation part RHL2, respectively. Since the first adhesive layer AL1 is not disposed under the folding region FA, the folding operation of the support portion SUP may be performed more easily.

The second adhesive layer AL2 may be disposed between the second support plate PLT2 and the heat dissipation layer RHL. A portion of the second adhesive layer AL2 overlapping the folding region FA may be open. That is, the second adhesive layer AL2 may not be disposed under the folding region FA.

The second adhesive layer AL2 may include a 2_1 adhesive layer AL2_1 overlapping the first non-folding region NFA1 and a 2_2 adhesive layer AL2_2 overlapping the second non-folding region NFA2. The 2_2 adhesive layer AL2_2 may be spaced apart from the 2_1 adhesive layer AL2_1. In the first direction DR1, the second distance DT2 between the 2_1 adhesive layer AL2_1 and the 2_2 adhesive layer AL2_2 may be larger than the first width WT1 of the third heat dissipation part RHL3.

The 2_1 adhesive layer AL2_1 and the 2_2 adhesive layer AL2_2 may not overlap the folding region FA. A region between the 2_1 adhesive layer AL2_1 and the 2_2 adhesive layer AL2_2 may be defined as the open portion of the second adhesive layer AL2. The 2_1 adhesive layer AL2_1 and the 2_2 adhesive layer AL2_2 may substantially have the same shapes as those of the first heat dissipation part RHL1 and the second heat dissipation part RHL2, respectively. Since the second adhesive layer AL2 is not disposed under the folding region FA, the folding operation of the support portion SUP may be performed more easily.

A space between the 1_1 adhesive layer AL1_1 and the 1_2 adhesive layer AL1_2 may be an open portion A_OP of the first adhesive layer AL1 overlapping the folding region FA. A space between the 2_1 adhesive layer AL2_1 and the 2_2 adhesive layer AL2_2 may be an open portion A_OP of the second adhesive layer AL2 overlapping the folding region FA. The second distance DT2 may be greater than the first and second widths WT1 and WT2. Therefore, the open portion A_OP of each of the first and second adhesive layers AL1 and AL2 may have a greater width than a width of the third heat dissipation part RHL3 and a width the bending portion BAP in the folding region FA.

The step compensation layer CP may be disposed between the cover layer COV and the second support plate PLT2. The step compensation layer CP may be disposed around the edge of the heat dissipation layer RHL and around the edge of each of the first and second adhesive layers AL1 and AL2. The step compensation layer CP may include a double-sided adhesive (e.g., double-sided tape).

The heat dissipation layer RHL and the first and second adhesive layers AL1 and AL2 may not be disposed in a portion adjacent to the edge of the cover layer COV and the edge of the second support plate PLT2. The step compensation layer CP may be adjacent to the edges of the cover layer COV and the second support plate PLT2. The step compensation layer CP may surround the heat dissipation layer RHL and the first and second adhesive layers AL1 and AL2.

The step compensation layer CP may be disposed between the cover layer COV and the second support plate PLT2 in a portion in which the first and second adhesive layers AL1 and AL2 are not disposed. The step compensation layer CP may compensate for a step of the heat dissipation layer RHL and the portion in which the first and second adhesive layers AL1 and AL2 are not disposed.

Referring to FIG. 4 to FIG. 7, the first step compensation layers SCL1 may overlap the folding region FA, and may be disposed in a region in which the first adhesive layer AL1 is open. That is, the first step compensation layers SCL1 may be disposed between the 1_1 adhesive layer AL1_1 and the 1_2 adhesive layer AL1_2.

In the third direction DR3, the first step compensation layer SCL1 may be disposed between the heat dissipation layer RHL and the first support plate PLT1. Specifically, the first step compensation layers SCL1 may be disposed between the heat dissipation layer RHL and the cover layer COV. The first step compensation layers SCL1 may compensate for a step of a portion in which the first adhesive layer AL1 is not disposed.

Referring to FIG. 6 and FIG. 7, the first step compensation layers SCL1 may be attached to the heat dissipation layer RHL. The first step compensation layers SCL1 may be attached to the third heat dissipation part RHL3 and may not be attached to the cover layer COV. The first step compensation layers SCL1 may be single-sided adhesives (e.g., single-sided tapes). In an embodiment, an adhesive layer may not be disposed on upper surfaces of the first step compensation layers SCL1, and the first adhesive layer ADL1 may be disposed on lower surfaces of the first step compensation layers SCL1, for example. The first adhesive layer ADL1 may be disposed between the first step compensation layers SCL1 and the third heat dissipation part RHL3.

Referring to FIG. 4, FIG. 6, and FIG. 7, the second step compensation layers SCL2 may overlap the folding region FA, and may be disposed between the first heat dissipation part RHL1 and the second heat dissipation part RHL2. The second step compensation layers SCL2 may be disposed around the third heat dissipation part RHL3. The third heat dissipation part RHL3 may be disposed between the second step compensation layers SCL2. In a region overlapping the first protrusion portions PRT1 and second protrusion portions PRT2, the second step compensation layers SCL2 may have a concave shape.

Each of the second step compensation layers SCL2 may a single-sided adhesive (e.g., single-sided tape). The second step compensation layers SCL2 may be attached to the second support plate PLT2, and may not be attached to the cover layer COV. In an embodiment, an adhesive layer may not be disposed on upper surfaces of the second step compensation layers SCL2, and the second adhesive layer ADL2 may be disposed on lower surfaces of the second step compensation layers SCL2, for example. The second adhesive layer ADL2 may be disposed between the second step compensation layers SCL2 and the second support plate PLT2.

In the illustrated embodiment, two first step compensation layers SCL1 and four second step compensation layers SCL2 are illustrated. However, the number of the first step compensation layers SCL1 and the number of the second step compensation layers SCL2 are not limited thereto.

Hereinafter, in the disclosure, "thickness" refers to a numerical value measured in the third direction DR3. In FIG. 5, "width" may be defined as a numerical value measured in the horizontal direction.

Referring to FIG. 5, the thickness of the first support plate PLT1 may be greater than the thickness of the second support plate PLT2, and the thickness of the second support plate PLT2 may be greater than the thickness of each of the heat dissipation layer RHL and the step compensation layer CP. The thickness of the step compensation layer CP may be greater than the thickness of the heat dissipation layer RHL. The thickness of the heat dissipation layer RHL may be greater than the thickness of the cover layer COV. The thickness of the cover layer COV may be greater than the thickness of each of the first and second adhesive layers AL1 and AL2.

In an embodiment, the thickness of the first support plate PLT1 may be about 150 micrometers, and the thickness of the second support plate PLT2 may be about 50 micrometers, and the thickness of the step compensation layer CP may be about 40 micrometers. In an embodiment, the thickness of the heat dissipation layer RHL may be about 31 micrometers, the thickness of the cover layer COV may be about 16 micrometers, and the thickness of each of the first and second adhesive layers AL1 and AL2 may be about 4 micrometers.

The width of the first support plate PLT1 may be greater than the width of the second support plate PLT2 and the width of the cover layer COV. The edge of each of the second support plate PLT2 and the cover layer COV may be disposed on a further inner side than the edge of the first support plate PLT1. The edge of the step compensation layer CP may be disposed on a further inner side than the edge of each of the second support plate PLT2 and the cover layer COV.

The width of the heat dissipation layer RHL and the width of each of the first and second adhesive layers AL1 and AL2 may be smaller than the width of the second support plate PLT2 and the width of the cover layer COV. The heat dissipation layer RHL and the first and second adhesive layers AL1 and AL2 may be disposed on a further inner side than the step compensation layer CP.

In an embodiment, the first and second adhesive layers AL1 and AL2 may include a pressure sensitive adhesive ("PSA") or an optically clear adhesive ("OCA"), but the type of an adhesive is not limited thereto.

Referring to FIG. 4, on each of the first support plate PLT1 and the second support plate PLT2, a first hole H1 and second holes H2 which respectively overlap the first hole region HA1 and the second hole regions HA2 may be defined. The first and second holes H1 and H2 may be defined in each of the cover layer COV and the step compensation layer CP. On each of the cover layer COV and the step compensation layer CP, the second holes H2 may be unitarily defined. The heat dissipation layer RHL, the first and second adhesive layers AL1 and AL2, and the first and second step compensation layers SCL1 and SCL2 may not overlap the first and second holes H1 and H2.

On each of the cover layer COV and the second support plate PLT2, a first opening OP1 and a second opening OP2 may be defined. The first opening OP1 may be adjacent to the second opening OP2. The second opening OP2 may also be defined in the step compensation layer CP. In the step compensation layer CP, the first opening OP1 may not be defined.

The first opening OP1 may also be defined in each of the heat dissipation layer RHL and the first and second adhesive layers AL1 and AL2. Substantially, portions of the heat dissipation layer RHL and the first and second adhesive layers AL1 and AL2 overlapping the first opening OP1 of the second support plate PLT2 may be removed, so that the first openings OP1 may be defined in the heat dissipation layer RHL and the first and second adhesive layer AL1 and AL2. Corners of the heat dissipation layer RHL and the first and second adhesive layer AL1 and AL2 may be removed, so that the first openings OP1 may be defined in the heat dissipation layer RHL and the first and second adhesive layers AL1 and AL2.

Functions of the first and second holes H1 and H2 and the functions of the first and second openings OP1 and OP2 will be described in detail hereinafter.

Referring to FIG. 4 and FIG. 5, the display module DM may be attached on the support portion SUP. The display module DM may be attached to an upper surface of the first support plate PLT1. The first support plate PLT1 may support the display module DM. By the heat dissipation layer RHL, the first support plate PLT1, and the second support plate PLT2, heat generated in the display module DM may be released.

The 2_1 support plate PLT2_1 may support the first non-folding region NFA1. The 2_2 support plate PLT2_2 may support the second non-folding region NFA2. The 2_1 support plate PLT2_1 and the 2_2 support plate PLT2_2 may be extended to the folding region FA and disposed adjacent to each other in the folding region FA.

The 2_1 support plate PLT2_1 and the 2_2 support plate PLT2_2 may support, under the folding region FA, the portion of the first support plate PLT1 in which the openings OP are defined. When pressure is applied to the first support plate PLT1 from the above, the deformation of the portion of the first support plate PLT1 in which the openings OP are defined may be prevented by the 2_1 support plate PLT2_1 and the 2_2 support plate PLT2_2.

The display module DM may include the display panel DP, a reflection prevention layer RPL, a window WIN, a window protection layer WP, a hard coating layer HC, a panel protection layer PPL, a barrier layer BRL, and third to eighth adhesive layers AL3 to ALB. The reflection prevention layer RPL, the window WIN, the window protection layer WP, and the hard coating layer HC may be disposed on the display panel DP. The panel protection layer PPL and the barrier layer BRL may be disposed under the display panel DP.

The reflection prevention layer RPL may be disposed on the display panel DP. The reflection prevention layer RPL may be defined as an external light reflection prevention film. The reflection prevention layer RPL may reduce the reflectance of external light incident toward the display panel DP from the outside.

When the external light incident toward the display panel DP is reflected from the display panel DP and provided again to an external user, like a mirror, the user may visually recognize the external light. In order to prevent the above phenomenon, in an embodiment, the reflection prevention layer RPL may include a plurality of color filters displaying the same color as that of pixels.

In an embodiment, the color filters may filter the external light to the same color as those of the pixels. In this case, the external light may not be visually recognized by the user. However, the invention is not limited thereto. In an embodiment, the reflection prevention layer RPL may include a phase retarder and/or a polarizer in order to reduce the reflectance of the external light.

The window WIN may be disposed on the reflection prevention layer RPL. The window WIN may protect the display panel DP and the reflection prevention layer RPL from external scratches. The window WIN may have optically transparent properties. In an embodiment, the window WIN may include glass. However, the invention is not limited thereto. In an embodiment, the window WIN may include a synthetic resin film.

The window WIN may have a multi-layered structure or a single-layered structure. In an embodiment, the window WIN may include a plurality of synthetic resin films bonded with an adhesive, or a glass substrate and a synthetic resin film bonded with an adhesive, for example.

The window protection layer WP may be disposed on the window WIN. In an embodiment, the a window protection layer WP may include a flexible plastic material such as polyimide ("PI") or polyethylene terephthalate ("PET"). The hard coating layer HC may be disposed on an upper surface of the window protection layer WP.

A print layer PIT may be disposed on a lower surface of the window protection layer WP. In an embodiment, the print layer PIT may be black, but the color of the print layer PIT is not limited thereto, and the color of the print layer PIT may be substantially dark. The print layer PIT may be adjacent to the edge of the window protection layer WP.

The third adhesive layer AL3 may be disposed between the window protection layer WP and the window WIN. By the third adhesive layer AL3, the window protection layer WP and the window WIN may be bonded to each other. The third adhesive layer AL3 may cover the print layer PIT.

The fourth adhesive layer AL4 may be disposed between the window WIN and the reflection prevention layer RPL. By the fourth adhesive layer AL4, the window WIN and the reflection prevention layer RPL may be bonded to each other.

The fifth adhesive layer AL5 may be disposed between the reflection prevention layer RPL and the display panel DP. By the fifth adhesive layer AL5, the reflection prevention layer RPL and the display panel DP may be bonded to each other.

The panel protection layer PPL may be disposed under the display panel DP. The panel protection layer PPL may protect a lower portion of the display panel DP. The panel protection layer PPL may include a flexible plastic material. In an embodiment, the panel protection layer PPL may include PET, for example.

The barrier layer BRL may be disposed under the panel protection layer PPL. The barrier layer BRL may increase resistance against compressive force caused by external pressing. Therefore, the barrier layer BRL may serve to prevent the deformation of the display panel DP. In an embodiment, the barrier layer BRL may include a flexible plastic material such as PI or PET.

The barrier layer BRL may have a color which absorbs light. In an embodiment, the barrier layer BRL may be black, but the color of the barrier layer BRL is not limited thereto, and the color of the barrier layer BRL may be substantially dark. In this case, when the display module DM is viewed from above the display module DM, elements disposed under the barrier layer BRL may not be visually recognized.

The sixth adhesive layer AL6 may be disposed between the display panel DP and the panel protection layer PPL. The display panel DP and the panel protection layer PPL may be bonded to each other by the sixth adhesive layer AL6.

The seventh adhesive layer AL7 may be disposed between the panel protection layer PPL and the barrier layer BRL. The panel protection layer PPL and the barrier layer BRL may be bonded to each other by the seventh adhesive layer AL7.

The eighth adhesive layer AL8 may be disposed between the barrier layer BRL and the first support plate PLT1. The barrier layer BRL and the first support plate PLT1 may be bonded to each other by the eighth adhesive layer AL8. The eighth adhesive layer AL8 may not overlap the folding region FA. That is, the eighth adhesive layer AL8 may not be disposed in the folding region FA.

In an embodiment, the third to eighth adhesive layers AL3 and AL8 may include a transparent adhesive, such as a PSA or an OCA, but the type of the adhesive is not limited thereto.

The thickness of the panel protection layer PPL may be smaller than the thickness of the window protection layer WP, the thickness of the reflection prevention layer RPL may be smaller than the thickness of the panel protection layer PPL, and the thickness of the display panel DP may be smaller than the thickness of the reflection prevention layer RPL. The thickness of the window WIN may be the same as the thickness of the reflection prevention layer RPL. The thickness of the barrier layer BRL may be smaller than the thickness of the panel protection layer PPL, and may be greater than the thickness of the reflection prevention layer RPL.

In an embodiment, the thickness of the window protection layer WP may be about 65 micrometers, and the thickness of the panel protection layer PPL may be about 50 micrometers. In an embodiment, the thickness of each of the reflection prevention layer RPL and the window WIN may be about 31 micrometers, the thickness of the display panel DP may be about 30 micrometers, and the thickness of the barrier layer BRL may be about 35 micrometers.

The thickness of the third adhesive layer AL3 may be the same as the thickness of the barrier layer BRL, and the thickness of the fourth adhesive layer AL4 and the fifth adhesive layer AL5 may be the same as the thickness of the panel protection layer PPL. The thickness of each of the sixth adhesive layer AL6 and the seventh adhesive layer AL7 may be smaller than the thickness of the display panel DP. The sixth adhesive layer AL6 and the seventh adhesive layer AL7 may have the same thickness.

The thickness of the eighth adhesive layer AL8 may be smaller than the thickness of each of the sixth adhesive layer AL6 and the seventh adhesive layer AL7, and the thickness of the hard coating layer HC may be smaller than the thickness of the eighth adhesive layer AL8. The thickness of each of the first and second adhesive layers AL1 and AL2 may be smaller than the thickness of the hard coating layer HC.

In an embodiment, the thickness of the third adhesive layer AL3 may be about 35 micrometers, and the thickness of the fourth adhesive layer AL4 and the fifth adhesive layer AL5 may be about 50 micrometers. In an embodiment, the thickness of each of the sixth adhesive layer AL6 and the seventh adhesive layer AL7 may be about 25 micrometers, the thickness of the eighth adhesive layer AL8 may be about 16 micrometers, and the thickness of the hard coating layer HC may be about 5 micrometers.

The width of the first support plate PLT1 may be greater than the width of the display module DM. The edge of the display module DM may be disposed on a further inner side than the edge of the first support plate PLT1.

The display panel DP, the reflection prevention layer RPL, the panel protection layer PPL, and the fifth and sixth adhesive layers AL5 and AL6 may have the same width. The window protection layer WP and the third adhesive layer AL3 may have the same width.

The widths of the display panel DP, the reflection prevention layer RPL, the panel protection layer PPL, and the fifth and sixth adhesive layers AL5 and AL6 may be greater than the widths of the window protection layer WP and the third adhesive layer AL3. The edges of the display panel DP, the reflection prevention layer RPL, the panel protection layer PPL, and the fifth and sixth adhesive layers AL5 and AL6 may be disposed on the outer side than the edges of the window protection layer WP and the third adhesive layer AL3.

The widths of the window WIN and the fourth adhesive layer AL4 may be smaller than the widths of the window protection layer WP and the third adhesive layer AL3. The width of the fourth adhesive layer AL4 may be smaller than the width of the window WIN. The edge of the window WIN may be disposed on a further inner side than the edges of the window protection layer WP and the third adhesive layer AL3. The edge of the fourth adhesive layer AL4 may be disposed on a further inner side than the edge of the window WIN.

The barrier layer BRL and the seventh and eighth adhesive layers AL7 and AL8 may have the same width. The edges of the barrier layer BRL and the seventh and eighth adhesive layers AL7 and AL8 may be disposed on a further inner side than the edges of the display panel DP, the reflection prevention layer RPL, the panel protection layer PPL, and the fifth and sixth adhesive layers AL5 and AL6.

In an embodiment, the distance between the edge of each of the barrier layer BRL, the seventh adhesive layer AL7, and the eighth adhesive layer AL8 and the edge of the first support plate PLT1 may be about 535 micrometers. In an embodiment, the distance between the edge of each of the display panel DP, the reflection prevention layer RPL, the panel protection layer PPL, the fifth adhesive layer AL5, and the sixth adhesive layer AL6 and the edge of the first support plate PLT1 may be about 187 micrometers.

In an embodiment, the distance between the edge of each of the display panel DP, the reflection prevention layer RPL, the panel protection layer PPL, the fifth adhesive layer AL5, and the sixth adhesive layer AL6 and the edge of the window WIN may be about 218 micrometers.

In an embodiment, the distance between the edge of each of the display panel DP, the reflection prevention layer RPL, the panel protection layer PPL, the fifth adhesive layer AL5, and the sixth adhesive layer AL6 and the edge of the fourth adhesive layer AL4 may be about 408 micrometers. In an embodiment, the distance between the edge of each of the window protection layer WP and the third adhesive layer AL3 and the edge of the window WIN may be about 210 micrometers.

Figure 8:
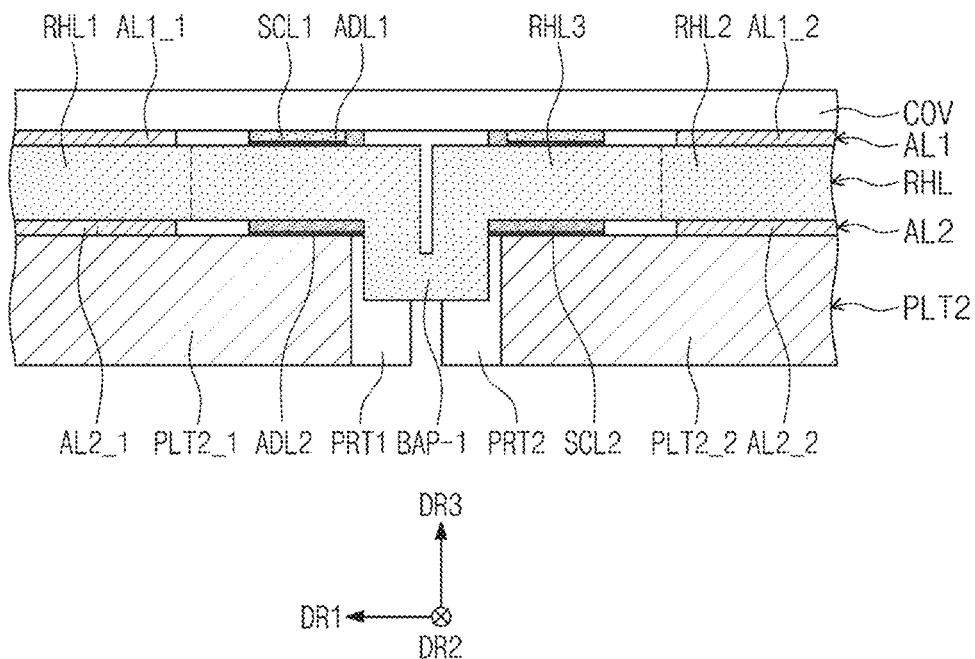
FIG. 8 and FIG. 9 are views illustrating various shapes of a bending portion illustrated in FIG. 5.
Figure 9:
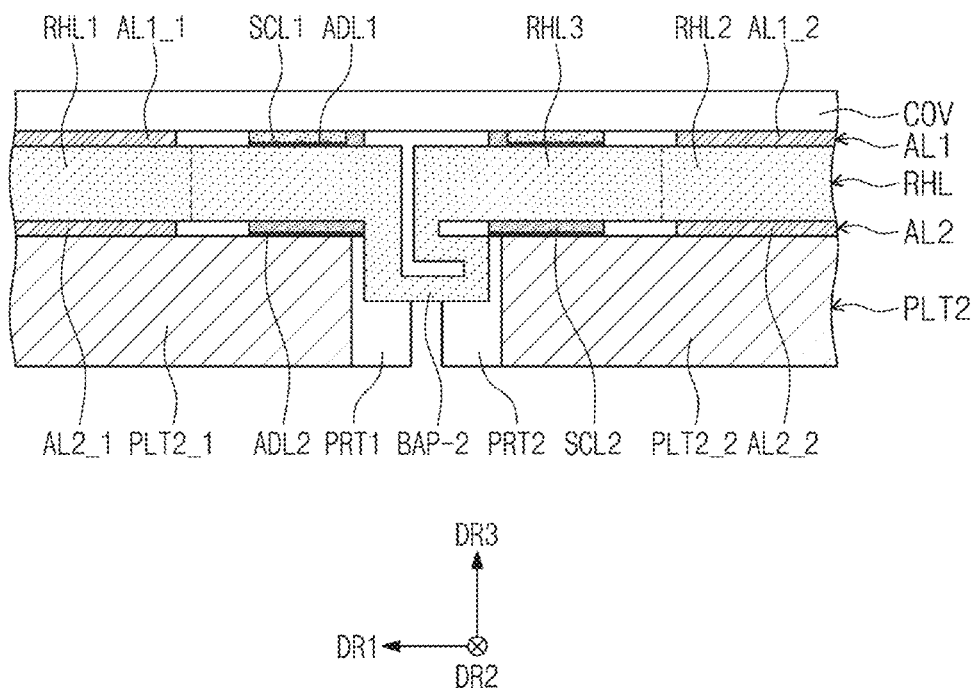

FIG. 8 and FIG. 9 are views illustrating various shapes of a bending portion illustrated in FIG. 5.

Referring to FIG. 8, in an embodiment, a bending portion BAP_1 may be bent in a downward direction, and convexly protrude in the downward direction. In a state in which the display module DM and the support portion SUP are unfolded, the bending portion BAP-1 may remain bent.

Referring to FIG. 9, a bending portion BAP 2 may be bent twice, first in the downward direction, and then in the right direction. In a state in which the display module DM and the support portion SUP are unfolded, the bending portion BAP-2 may remain bent.

In the illustrated embodiments in FIG. 5, FIG. 8, and FIG. 9, bending portions BAP, BAP-1, and BAP-2 in three shapes are illustrated. However, the shape of a bending portion is not limited thereto, and the bending portion may be bent in various ways.

Figure 10:
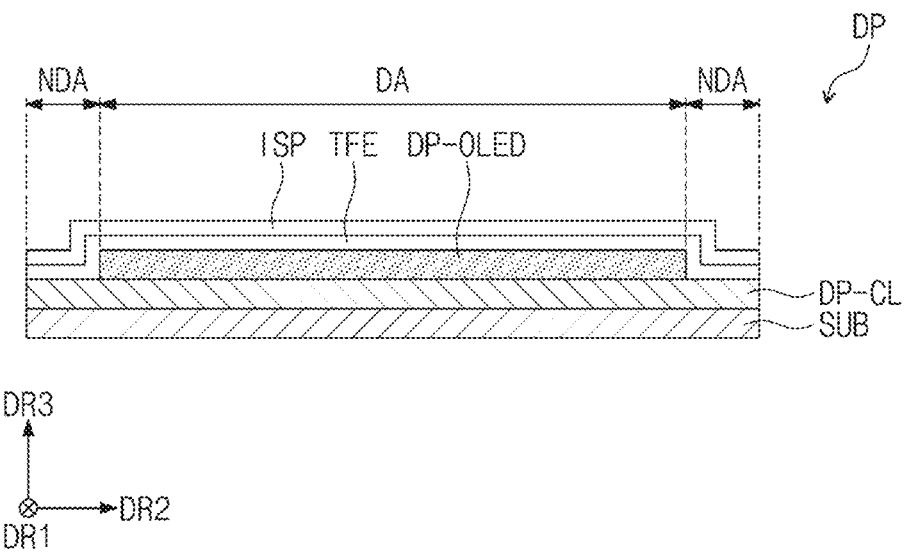
FIG. 10 is a view illustrating a cross-section of a display panel illustrated in FIG. 5.

FIG. 10 is a view illustrating a cross-section of a display panel illustrated in FIG. 5.

Referring to FIG. 10, the display panel DP may include a substrate SUB, a circuit element layer DP-CL disposed on the substrate SUB, a display element layer DP-OLED disposed on the circuit element layer DP-CL, a thin film encapsulation layer TFE disposed on the display element layer DP-OLED, and an input sensing unit ISP disposed on the thin film encapsulation layer TFE. The display element layer DP-OLED may be disposed on the display region DA.

The substrate SUB may include a display region DA and a non-display region NDA around the display region DA. The substrate SUB may include a flexible plastic material. In an embodiment, the substrate SUB may include PI, for example.

The circuit element layer DP-CL may include an insulation layer, a semiconductor pattern, a conductive pattern, a signal line, or the like. In an embodiment, the insulation layer, a semiconductor layer, and a conductive layer may be formed or disposed on the substrate SUB by methods such as coating, deposition, or the like. Thereafter, the insulation layer, the semiconductor layer, and the conductive layer may be selectively patterned through performing a photolithography process a plurality of times to form a semiconductor pattern, a conductive pattern, and a signal line.

The circuit element layer DP-CL may include transistors including or consisting of the semiconductor pattern, the conductive pattern, and the signal line. The display element layer DP-OLED may include emission elements connected to the transistors. The pixels PX illustrated in FIG. 3 may include the transistors and the emission elements.

The thin film encapsulation layer TFE may be disposed on the circuit element layer DP-CL to cover the display element layer DP-OLED. The thin film encapsulation layer TFE may include an inorganic layer, an organic layer, and an inorganic layer sequentially stacked. The inorganic layers include an inorganic material, and may protect the pixels from moisture/oxygen. In an embodiment, the organic layer includes an organic material, and may protect the pixels PX from foreign materials such as dust particles.

The input sensing unit ISP may include a plurality of sensors (now illustrated) for sensing an external input. The sensors may sense the external input in a capacitive manner. In an embodiment, the external input may include various forms of inputs such as a part of a user's body, light, heat, a pen, or pressure.

In an embodiment, the input sensing unit ISP may be directly manufactured on the thin film encapsulation layer TFE, when manufacturing the display panel DP. However, the invention is not limited thereto, and the input sensing unit ISP may be manufactured as a separate panel from the display panel DP, and be attached to the display panel DP by an adhesive layer.

Figure 11:
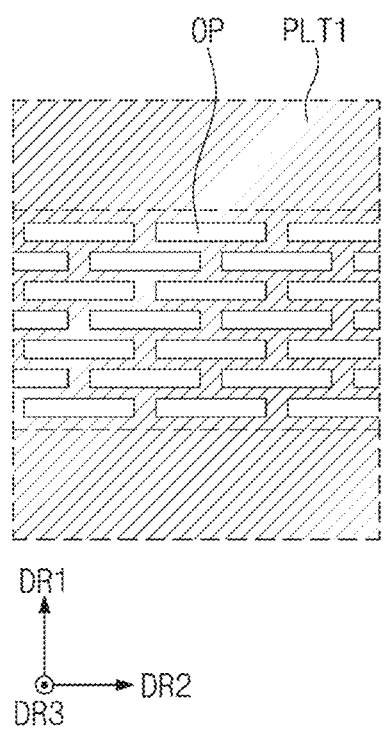
FIG. 11 is a plan view of a portion of a first support plate in which openings illustrated in FIG. 4 and FIG. 5 are defined.

FIG. 11 is a plan view of a portion of a first support plate in which openings illustrated in FIG. 4 and FIG. 5 are defined.

Referring to FIG. 4, FIG. 5, and FIG. 11, the openings OP defined in the first support plate PLT1 may be arranged by a predetermined rule. The openings OP may be arranged in a lattice form. Based on a row corresponding to the second direction DR2, openings OP disposed in an h-th row and openings OP disposed in an h+1-th row may be alternately disposed. Here, h is a natural number.

Since the openings OP are defined in the portion of the first support plate PLT1 overlapping the folding region FA, the first support plate PLT1 may be easily folded in a region overlapping the folding region FA.

Figure 12:
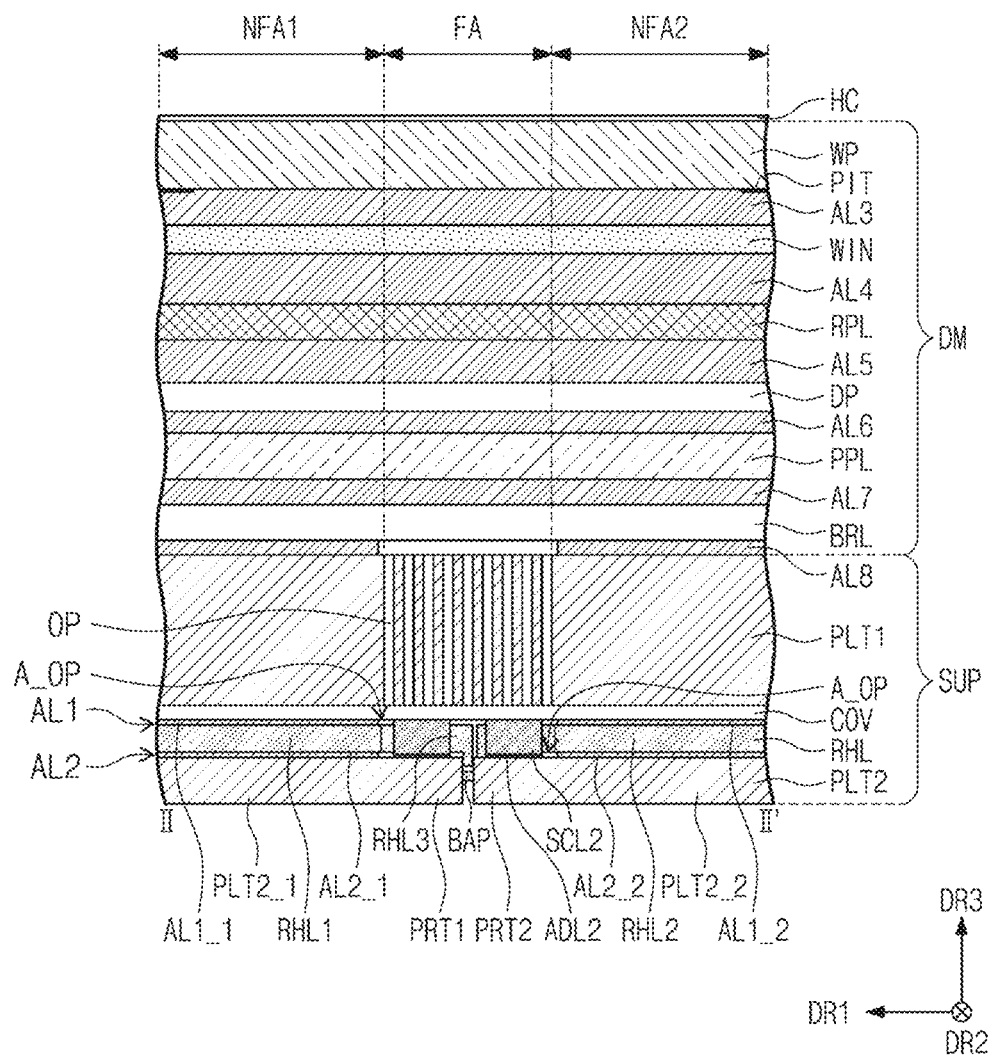
FIG. 12 is a cross-sectional view of line II-II' illustrated in FIG. 4.

FIG. 12 is a cross-sectional view of line II-II' illustrated in FIG. 4.

Referring to FIG. 4, FIG. 6, and FIG. 12, the second step compensation layers SCL2 may overlap the folding region FA, and may be disposed between the cover layer COV and the second support plate PLT2. As described above, the second step compensation layers SCL2 may be attached to the second support plate PLT2, and may not be attached to the cover layer COV.

The second step compensation layers SCL2 may be disposed in the open portion A_OP in which the first and second adhesive layers AL1 and AL2 are open. The second step compensation layers SCL2 may be disposed between the first heat dissipation layer RHL1 and the second heat dissipation layer RHL2, between the 1_1 adhesive layer AL1_1 and the 1_2 adhesive layer AL1_2, and between the 2_1 adhesive layer AL2_1 and the 2_2 adhesive layer AL2_2.

The second step compensation layer SCL2 may be disposed in a portion between the first heat dissipation layer RHL1 and the second heat dissipation layer RHL2 in which the third heat dissipation part RHL3 and the first and second adhesive layers AL1 and AL2 are not disposed. The second step compensation layer SCL2 may compensate for a step of the portion in which the third heat dissipation part RHL3 and the first and second adhesive layers AL1 and AL2 are not disposed.

Referring to FIG. 5, FIG. 7, and FIG. 11, in the third direction DR3, the thickness of each of the second step compensation layers SCL2 may be greater than the thickness of each of the first step compensation layers SCL1. Since the first and second step compensation layers SCL1 and SCL2 are disposed in the portion in which the first and second adhesive layers AL1 and AL2 and the third heat dissipation part RHL3 are not disposed, the structure of the support portion SUP may be more firmly implemented. The first and second protrusion portions PRT1 and PRT2 may support the second step compensation layers SCL2.

Figure 13:
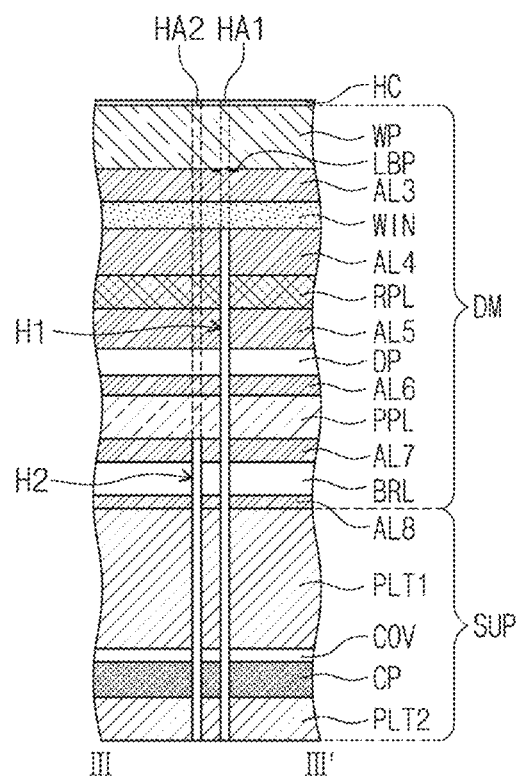
FIG. 13 is a cross-sectional view of line illustrated in FIG. 4.

FIG. 13 is a cross-sectional view of line illustrated in FIG. 4.

Referring to FIG. 4 and FIG. 13, in the support portion SUP and the display module DM, the first hole H1 and the second holes H2 overlapping the first and second hole regions HA1 and HA2 may be defined. Around the first hole region HA1, a light-blocking pattern LBP may be disposed. The light-blocking pattern LBP may be disposed in the same layer as the print layer PIT. The light-blocking pattern LBP may be disposed on a lower surface of the window protection layer WP.

The first hole H1 may be defined from the second support plate PLT2 to the fourth adhesive layer AL4. In an embodiment, the first hole H1 may be defined in the second support plate PLT2, the step compensation layer CP, the cover layer COV, the first support plate PLT1, the barrier layer BRL, the panel protection layer PPL, the display panel DP, the reflection prevention layer RPL, and the fourth to eighth adhesive layers AL4 to ALB, for example.

The second hole H2 may be defined from the second support plate PLT2 to the seventh adhesive layer AL7. In an embodiment, the second hole H2 may be defined in the second support plate PLT2, the step compensation layer CP, the cover layer COV, the first support plate PLT1, the barrier layer BRL, and the seventh to eighth adhesive layers AL7 to ALB, for example.

In the first hole H1, the above-described camera CM may be disposed. In the second hole H2, the above-described sensor SN may be disposed. Through the first and second holes H1 and H2, an optical signal may be provided to the camera CM and the sensor SN.

Figure 14:
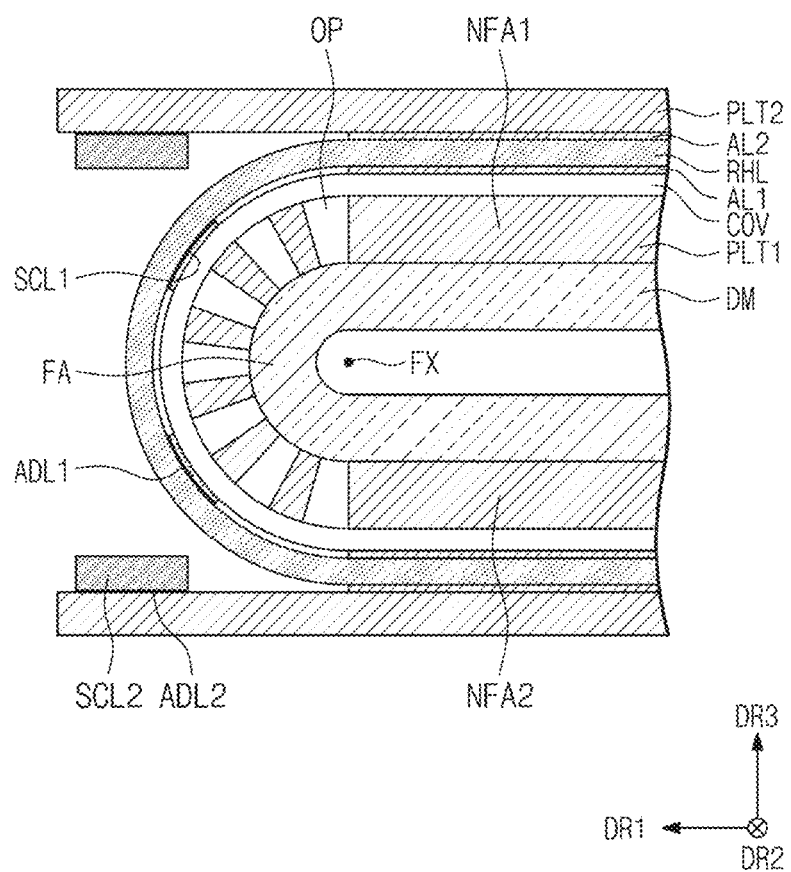
FIG. 14 is a view illustrating the display device illustrated in FIG. 4 in an in-folded state.

FIG. 14 is a view illustrating the display device illustrated in FIG. 4 in an in-folded state.

In the illustrated embodiment, the detailed components of the display module DM are not illustrated in FIG. 14.

Referring to FIG. 14, the display device DD may be in-folded around the folding axis FX. The folding region FA may be bent, so that the first non-folding region NFA1 and the second non-folding region NFA2 may face each other. The first non-folding region NFA1 overlapping the 2_1 support plate PLT2_1 and the second non-folding region NFA2 overlapping the 2_2 support plate PLT2_2 may remain flat.

The display device DD may be changed from the first state of being flat as illustrated in FIG. 5 to the second state of being folded as illustrated in FIG. 14, or may be changed from the second state to the first state. The folding operation may be repeatedly performed.

Since the display module DM is a flexible display module, the folding region FA of the display module DM may be easily bent. In the first support plate PLT1, a plurality of the openings OP overlapping the folding region FA may be defined. Therefore, during a folding operation, the portion of the first support plate PLT1 overlapping the folding region FA may easily be bent by the openings OP.

The second step compensation layers SCL2 are attached to the second support plate PLT2, but are not attached to the cover layer COV, so that the second step compensation layers SCL2 may move along the second support plate PLT2 when the display device DD is folded.

When the second step compensation layers SCL2 are also attached to the cover layer COV, during a folding operation, since the second support plate PLT2 maintaining a flat state and the cover layer COV bent into a curve are moved away from each other, the second step compensation layers SCL2 may be damaged. In addition, during a folding operation, since the second support plate PLT2 and the cover layer COV are moved away from each other, the second step compensation layers SCL2 may be de-laminated from the second support plate PLT2 or the cover layer COV.

Therefore, in the embodiment of the invention, the second step compensation layers SCL2 may be disposed to be attached only to the second support plate PLT2.

Referring to FIG. 5 and FIG. 14, the bending portion BAP of the heat dissipation layer RHL may have a curved shape having a predetermined curvature when the display module DM and the support portion SUP are folded. When the bending portion BAP is not formed or provided in the heat dissipation layer RHL, when the folding region FA is folded, the heat dissipation layer RHL may be damaged due to a large tensile force generated in a portion of the heat dissipation layer RHL overlapping the folding region FA.

However, in the embodiment of the invention, when the display module DM and the support portion SUP are in an unfolded state, the heat dissipation layer RHL and the bending portion BAP are already bent, and when the display module DM and the support portion SUP are folded, the bent bending portion BAP may have a curved shape. Therefore, when the folding region FA is folded, the tensile force generated in the portion of the heat dissipation layer RHL overlapping the folding region FA is reduced, so that the damage of the heat dissipation layer RHL may be prevented.

When the heat dissipation layer RHL is disposed under the second support plate PLT2, and thus disposed at the further outer periphery, during a folding operation, the portion of the heat dissipation layer RHL overlapping the folding region FA may be bent to have a larger radius of curvature. As the radius of curvature becomes larger, the tensile force generated in the heat dissipation layer RHL becomes greater.

In the embodiment of the invention, the heat dissipation layer RHL may be disposed between the first support plate PLT1 and the second support plate PLT2. Therefore, during a folding operation, the portion of the heat dissipation layer RHL overlapping the folding region FA may be bent to have a smaller radius of curvature. As a result, during the folding operation, the tensile force generated in the heat dissipation layer RHL may be reduced.

Figure 15:
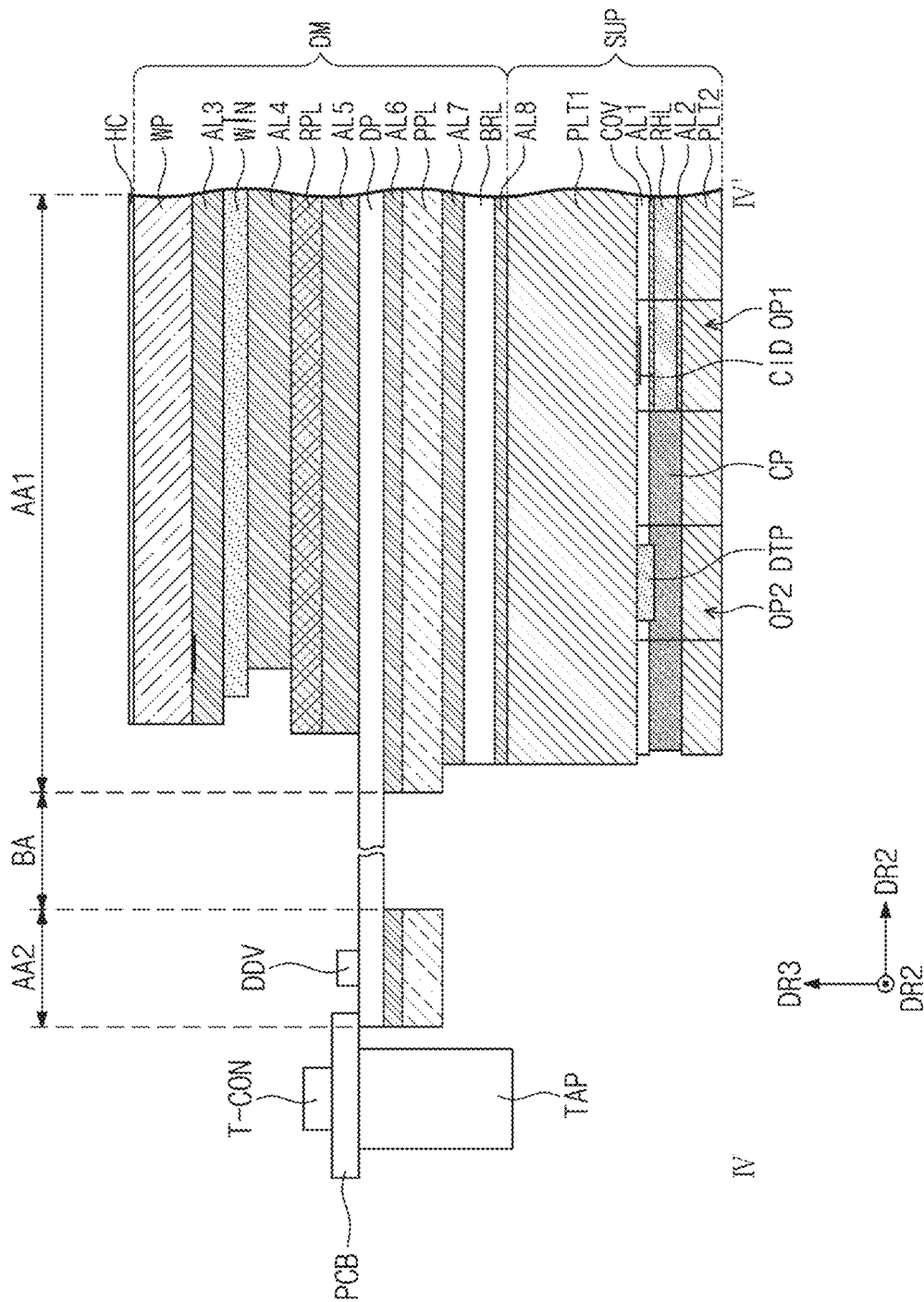
FIG. 15 is a cross-sectional view of line IV-IV' illustrated in FIG. 4.
Figure 16:
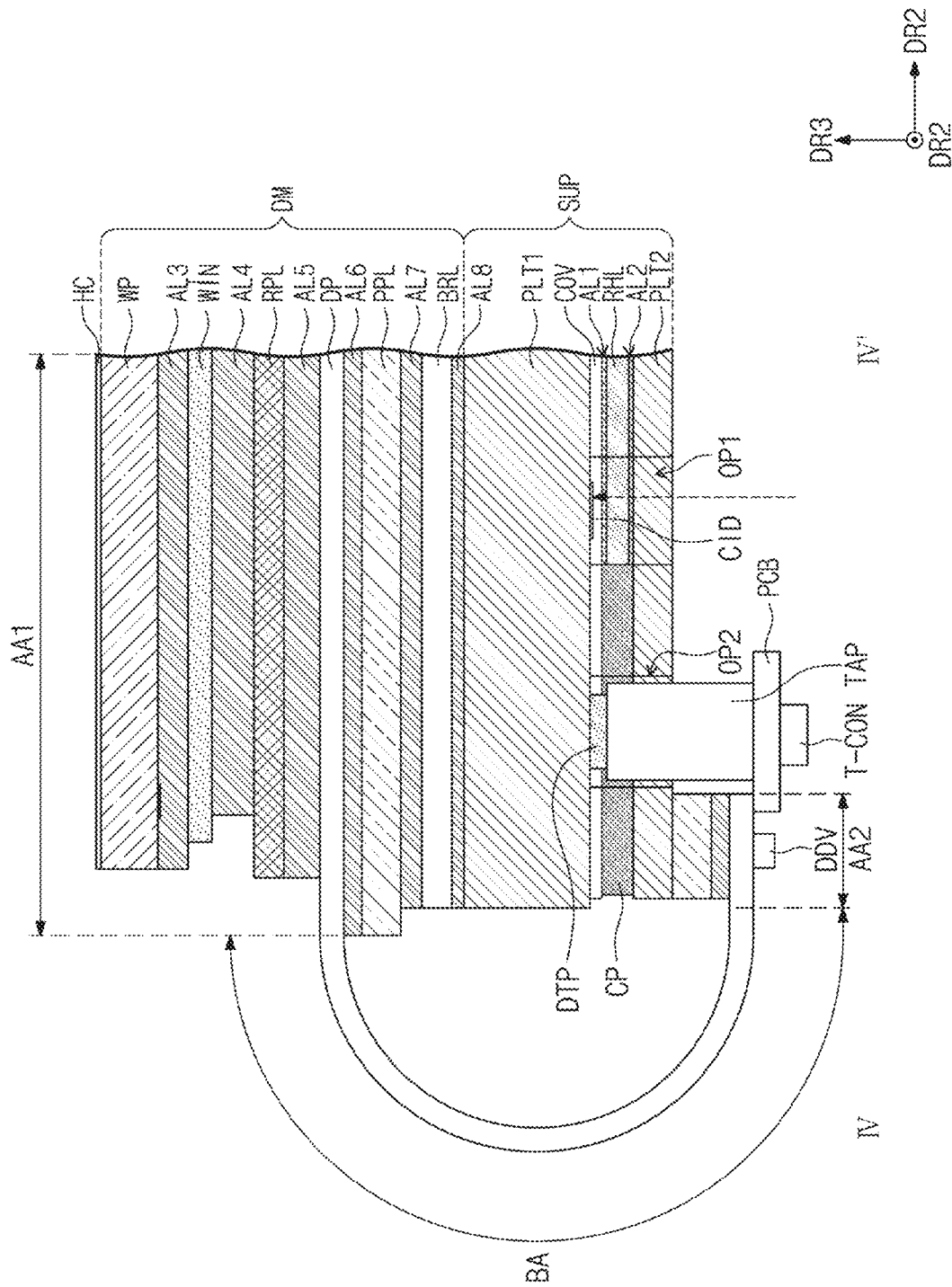
FIG. 16 is a view illustrating a bending region illustrated in FIG. 15 in a bent state.

FIG. 15 is a cross-sectional view of line IV-IV' illustrated in FIG. 4. FIG. 16 is a view illustrating a bending region illustrated in FIG. 15 in a bent state.

Referring to FIG. 4 and FIG. 15, one sides of the barrier layer BRL and the seventh and eighth adhesive layers AL7 and AL8 may overlap one side of the first support plate PLT1. One sides of the display panel DP, the panel protection layer PPL, and the sixth adhesive layer AL6 may be disposed at the outer periphery than the one side of the first support plate PLT1.

The panel protection layer PPL and the sixth adhesive layer AL6 may not be disposed under the bending region BA. The data driver DDV may be disposed on the second region AA2 of the display panel DP.

The printed circuit board PCB may be connected to the display module DM. In an embodiment, the printed circuit board PCB may be connected to one side of the second region AA2, for example. On the printed circuit board PCB, a timing controller T-CON may be disposed. The timing controller T-CON may be formed or provided as an IC chip, and mounded on an upper surface of the printed circuit board PCB.

Under the printed circuit board PCB, an adhesive (e.g., tape) TAP may be disposed. The adhesive TAP may include a double-sided adhesive (e.g., double-sided tape). The adhesive TAP may be disposed on a lower surface of the printed circuit board PCB to be attached to the lower surface of the printed circuit board PCB.

On a lower surface of the first support plate PLT1, a cell identifier ("ID") layer CID may be disposed. The cell ID layer CID may be defined as a product unique number. The first opening OP1 may be defined in each of the second support plate PLT2, the heat dissipation layer RHL, the cover layer COV, the first adhesive layer AL1, and the second adhesive layer AL2. The cell ID layer CID may be exposed to the outside by the first opening OP1. An operator may check the product unique number through the first opening OP1 during a process.

Referring to FIG. 16, the bending region BA is bent, so that the second region AA2 may be disposed under the first region AA1. Therefore, the data driver DDV, the printed circuit board PCB, the timing controller T-CON, and the adhesive TAP may be disposed under the first region AA1.

The data driver DDV, the printed circuit board PCB, the timing controller T-CON, and the adhesive TAP may be disposed under the second support plate PLT2. The lower surface of the printed circuit board PCB may face the lower surface of the first support plate PLT1.

The second opening OP2 may be defined in the second support plate PLT2, the step compensation layer CP, and the cover layer COV. The adhesive TAP may be inserted into the second opening OP2 to be attached to the first support plate PLT1. The adhesive TAP is attached to the first support plate PLT1, so that the printed circuit board PCB and the timing controller T-CON may be fixed to the support portion SUP.

A dummy adhesive (e.g., dummy tape) DTP may be disposed between the first support plate PLT1 and the adhesive TAP. The adhesive TAP may be attached to the first support plate PLT1 by the dummy adhesive DTP.

The dummy adhesive DTP may include a single-sided adhesive (e.g., single-sided tape). In an embodiment, an adhesive may be disposed on an upper surface of the dummy adhesive DTP facing the first support plate PLT1, and an adhesive may not be disposed on a lower surface of the dummy adhesive DTP facing the adhesive TAP, for example. The upper surface of the dummy adhesive DTP may be attached to the lower surface of the first support plate PLT1, and one surface of the adhesive TAP facing the dummy adhesive DTP may be attached to the lower surface of the dummy adhesive DTP.

The adhesive TAP may be pressed toward the first support plate PLT1 to be attached to the first support plate PLT1. When the adhesive TAP is directly attached to the first support plate PLT1, a sticky material may be leaked out of the thick adhesive TAP due to the pressure at the time of the pressing process. When the sticky material is attached to the first support plate PLT1 and then detached therefrom, a strange sound may occur.

When the dummy adhesive DTP is first attached to the first support plate PLT1, and then the adhesive TAP is attached to the dummy adhesive DTP, the sticky material leaked out of the adhesive TAP may not be provided to the first support plate PLT1, so that the strange sound may be prevented from occurring.

Figure 17:
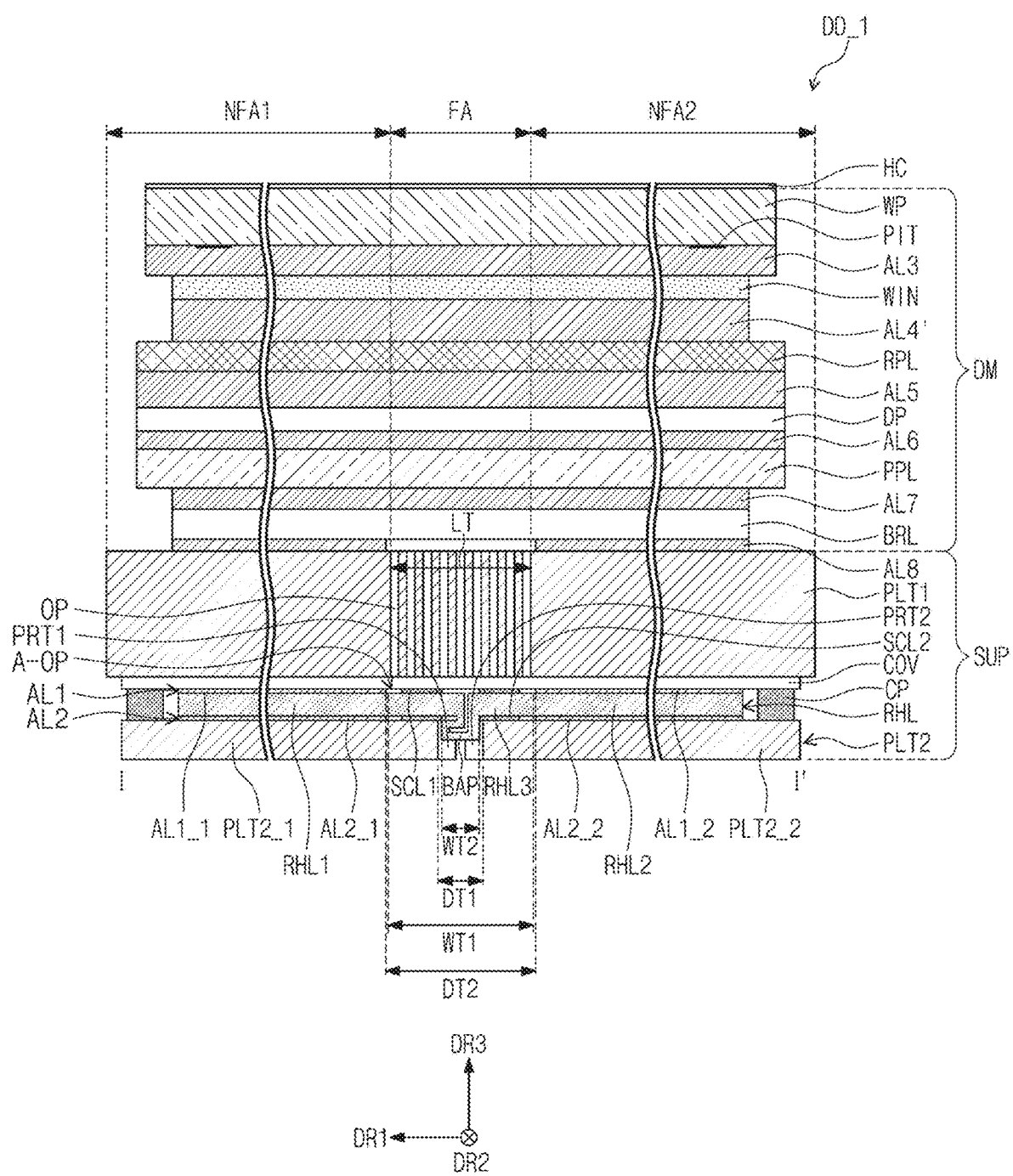
FIG. 17 is a view showing another embodiment of the configuration of a display device according to the invention.

FIG. 17 is a view showing another embodiment of the configuration of a display device according to the invention.

FIG. 17 is illustrated as a cross-section corresponding to FIG. 5.

Referring to FIG. 17, a fourth adhesive layer AL4' of a display device DD_1 may have the same width as the window WIN. The edge of the fourth adhesive layer AL4' may overlap the edge of the window WIN. Therefore, the fourth adhesive layer AL4' may not be disposed to be stepped with the window WIN. When the fourth adhesive layer AL4' and the window WIN are not provided to be stepped with each other, foreign substances may be prevented from entering between the fourth adhesive layer AL4' and the window WIN.

Figure 18:
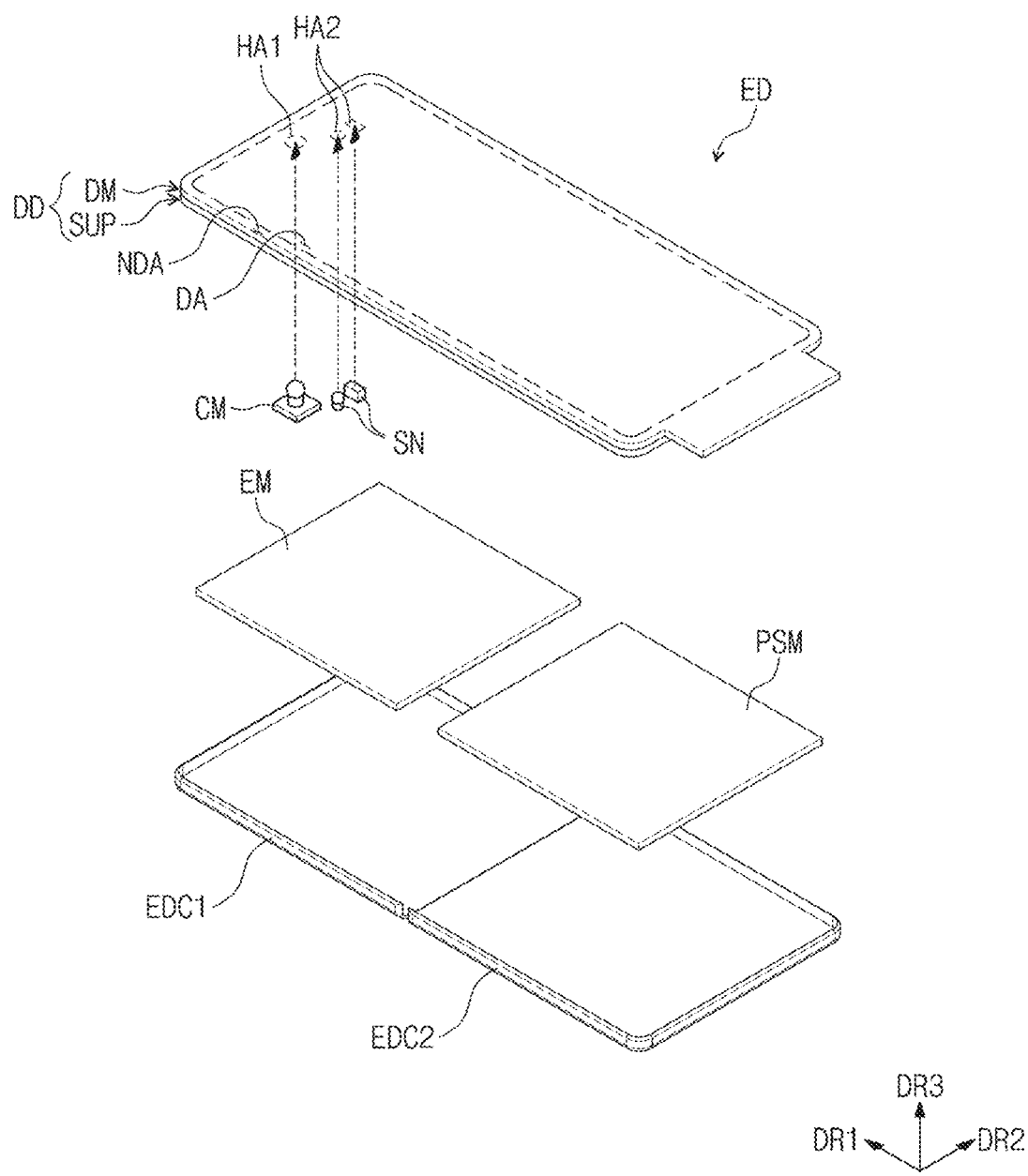
FIG. 18 is an exploded perspective view of the electronic device illustrated in FIG. 1.

FIG. 18 is an exploded perspective view of the electronic device illustrated in FIG. 1.

Referring to FIG. 18, the electronic device ED may include the display device DD, the camera CM, the sensors SN, an electronic module EM, a power source module PSM, and cases EDC1 and EDC2. The display device DD may include the display module DM and the support portion SUP. The configurations of the display module DM and the support portion SUP have been described with reference to FIG. 3 and FIG. 5, and thus, descriptions thereof will be omitted. Although not separately illustrated, the electronic device ED may further include instrument structures for controlling the folding operation of the display device DD.

The camera CM and the sensors SN may be disposed under the display device DD. As described above, the first and second hole regions HA1 and HA2 are defined in the display device DD, and the camera CM may be disposed in the first hole region HAL and the sensors SN may be disposed in the second hole regions HA2.

The electronic module EM and the power source module PSM may be disposed under the display device DD. Although not illustrated, the electronic module EM and the power source module PSM may be connected to each other through a flexible circuit board. The electronic module EM may control the operation of the display device DD. The power source module PSM may provide power to the electronic module EM.

The cases EDC1 and EDC2 may accommodate the display device DD, the electronic module EM, and the power source module PSM. The cases EDC1 and EDC2 may be divided into two first and second cases EDC1 and EDC2 to fold the display device DD. The cases EDC1 and EDC2 may protect the display device DD, the electronic module EM, and the power source module PSM.

Figure 19:
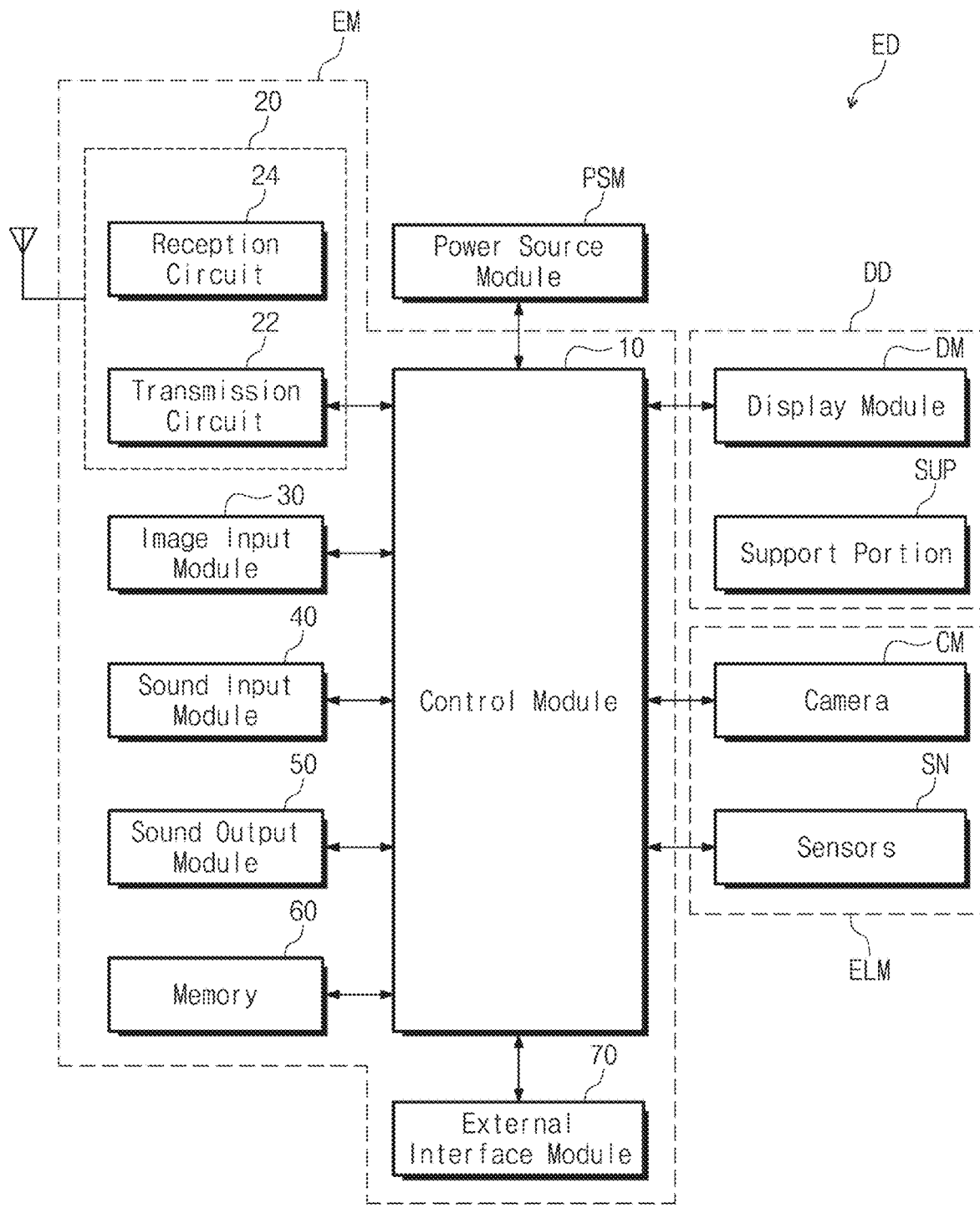
FIG. 19 is a block diagram of the electronic device illustrated in FIG. 18.

FIG. 19 is a block diagram of the electronic device illustrated in FIG. 18.

Referring to FIG. 19, the electronic module EM may include a control module 10, a wireless communication module 20, an image input module 30, a sound input module 40, a sound output module 50, a memory 60, an external interface module 70, or the like. The modules may be disposed (e.g., mounted) on a circuit board, or may be electrically connected though a flexible circuit board. The electronic module EM may be electrically connected to the power source module PSM.

The control module 10 may control the overall operation of the electronic device ED. In an embodiment, the control module 10 activates or deactivates the display device DD in accordance with a user input, for example. The control module 10 may control the image input module 30, the sound input module 40, the sound output module 50, or the like. The control module 10 may include at least one microprocessor.

The wireless communication module 20 may transmit/receive wireless signals with other terminals using Bluetooth or a Wi-Fi line. The wireless communication module 20 may transmit/receive voice signals using a general communication line. The wireless communication module 20 may include a transmission circuit 22 which modulates and then transmits a signal to be transmitted and a reception circuit 24 which demodulates a received signal.

The image input module 30 processes an image signal and converts the processed image signal into image data displayable on the display device DD. The sound input module 40 may receive an external sound signal through a microphone in a recording mode, a voice recognition mode, or the like and convert the received external sound signal into electrical voice data. The sound output module 50 may convert sound data received from the wireless communication module 20 or sound data stored in the memory 60 and output the converted sound data to the outside.

The external interface module 70 may serve as an interface to be connected to an external charger, a wired/wireless data port, a card socket module (e.g., a memory card and a subscriber identity module/user identity module ("SIM/UIM") card), or the like.

The power source module (also referred to as a power supply module) PSM supplies power desired for the overall operation of the electronic device ED. The power source module PSM may include a typical battery device.

The electronic optical module ELM may be an electronic component which outputs or receives an optical signal. The electronic optical module EML transmits or receives an optical signal through some regions of the display device DD. In the illustrated embodiment, the electronic optical module ELM may include a camera CM. The camera CM may receive natural light to capture an external image. The electronic optical module ELM may include sensors SN such as a near-illumination sensor.

In an embodiment of the invention, a unitary heat dissipation layer, not a separable heat dissipation layer, is used, so that heat dissipation performance may be improved.

In addition, an adhesive layer is not disposed in a region overlapping a folding region, so that a support portion may be more easily folded, and step compensation layers are disposed in a portion in which the adhesive layer is not disposed, so that the structure of the support portion may be more firmly implemented.

In addition, the heat dissipation layer is disposed between a first support plate and a second support plate, so that the heat dissipation layer is more stably disposed in a display device to prevent damage to the heat dissipation layer.

Although the invention has been described with reference embodiments of the invention, it will be understood by those skilled in the art that various modifications and changes in form and details may be made therein without departing from the spirit and scope of the invention as set forth in the following claims. In addition, the embodiments disclosed in the description are not intended to limit the technical spirit of the invention, and all technical concepts falling within the scope of the following claims and equivalents thereof are to be construed as being included in the scope of the invention.

What is claimed is:

1. A display device comprising:
   a display module including a first non-folding region, a folding region, and a second non-folding region arranged in a first direction;
   a first support plate disposed on the display module;
   a second support plate disposed on the first support plate;
   a heat dissipation layer disposed between the first and second support plates, and including a bending portion overlapping the folding region;
   a first adhesive layer disposed between the first support plate and the heat dissipation layer; and a second adhesive layer disposed between the second support plate and the heat dissipation layer, wherein an opening defined in each of the first and second adhesive layers has a width greater than a width of the bending portion of the heat dissipation layer in the first direction and in a portion overlapping the folding region, and the bending portion protrudes toward the second support plate so that the bending portion is closer to the second support plate than a surface of the second adhesive layer facing the second support plate is to the second support plate.

2. The display device of claim 1, further comprising a cover layer disposed between the first support plate and the first adhesive layer, wherein:

a plurality of openings is defined in a portion of the first support plate overlapping the folding region; and the cover layer covers the plurality of openings.

3. The display device of claim 2, further comprising a step compensation layer disposed around an edge of the heat dissipation layer and around an edge of each of the first and second adhesive layers between the cover layer and the second support plate.

4. The display device of claim 2, further comprising a first step compensation layer overlapping the folding region, and disposed between the heat dissipation layer and the cover layer in a portion in which the first adhesive layer is open.

5. The display device of claim 4, wherein the first step compensation layer is attached to the heat dissipation layer, and is not attached to the cover layer.

6. The display device of claim 2, wherein the heat dissipation layer comprises:

a first heat dissipation part overlapping the first non-folding region;

a second heat dissipation part overlapping the second non-folding region; and a third heat dissipation part overlapping the folding region and including the bending portion, wherein in a second direction crossing the first direction, a width of the third heat dissipation part is smaller than a width of each of the first and second heat dissipation parts.

7. The display device of claim 6, further comprising a second step compensation layer overlapping the folding region, and disposed around the third heat dissipation part between the first heat dissipation part and the second heat dissipation part.

8. The display device of claim 7, wherein the second step compensation layer is attached to the second support plate, and is not attached to the cover layer.

9. The display device of claim 6, wherein a bending portion defined as the bending portion of the third heat dissipation part remains a bent stage in a state in which the display module is unfolded.

10. The display device of claim 9, wherein the second support plate comprises:

a 2_1 support plate overlapping the first non-folding region; and a 2_2 support plate overlapping the second non-folding region, wherein the 2_1 support plate and the 2_2 support plate are spaced apart from each other on the folding region.

11. The display device of claim 10, wherein the bending portion is disposed between the 2_1 support plate and the 2_2 support plate.

12. The display device of claim 10, wherein in the first direction, a distance between the 2_1 support plate and the 2_2 support plate is smaller than the width of the third heat dissipation part.

13. The display device of claim 6, wherein the first adhesive layer comprises:

a 1_1 adhesive layer overlapping the first non-folding region; and a 1_2 adhesive layer spaced apart from the 1_1 adhesive layer and overlapping the second non-folding region, wherein the 1_1 adhesive layer and the 1_2 adhesive layer do not overlap the folding region.

14. The display device of claim 13, wherein in the first direction, a distance between the 1_1 adhesive layer and the 1_2 adhesive layer is larger than the width of the third heat dissipation part.

15. The display device of claim 6, wherein the second adhesive layer comprises:

a 2_1 adhesive layer overlapping the first non-folding region; and a 2_2 adhesive layer spaced apart from the 2_1 adhesive layer and overlapping the second non-folding region, wherein the 2_1 adhesive layer and the 2_2 adhesive layer do not overlap the folding region.

16. The display device of claim 15, wherein in the first direction, a distance between the 2_1 adhesive layer and the 2_2 adhesive layer is larger than the width of the third heat dissipation part.

17. The display device of claim 6, wherein the first heat dissipation part, the second heat dissipation part, and the third heat dissipation part are unitary with one another.

18. The display device of claim 1, further comprising an identifier layer disposed on an opposite surface of the first support plate opposite to a surface of the first support plate facing the display module, wherein the second support plate, the first and second adhesive layers, and the heat dissipation layer defining a first opening exposing the identifier layer.

19. The display device of claim 1, further comprising a printed circuit board connected to the display module, and disposed on the second support plate;

an adhesive disposed on a surface of the printed circuit board facing the first support plate, and disposed in a second opening defined in the second support plate; and a dummy adhesive disposed between the first support plate and the adhesive in the second opening, wherein the dummy adhesive includes:

a surface facing the first support plate and on which an adhesive is disposed; and an opposite surface opposite to the surface of the dummy adhesive, facing the adhesive and on which an adhesive is not disposed, wherein the adhesive includes a double-sided adhesive.

20. A display device comprising:

a display module including a first non-folding region, a folding region, and a second non-folding region arranged in a first direction;

a first support plate disposed on the display module;

a second support plate disposed on the first support plate;

a heat dissipation layer disposed between the first and second support plates;

a first adhesive layer disposed between the first support plate and the heat dissipation layer, and defining an open portion overlapping the folding region;

a second adhesive layer disposed between the second support plate and the heat dissipation layer, and defining an open portion overlapping the folding region; and a first step compensation layer overlapping the folding region, and disposed between the heat dissipation layer and the first support plate in a portion in which the first adhesive layer is open, wherein an opening defined in each of the first and second adhesive layers has a width greater than a width of the bending portion of the heat dissipation layer in the first direction and in a portion overlapping the folding region and the bending portion protrudes toward the second support plate so that the bending portion is closer to the second support plate than a surface of the second adhesive layer facing the second support plate is to the second support plate.

21. The display device of claim 20, wherein the heat dissipation layer comprises:
a first heat dissipation part overlapping the first non-folding region;
a second heat dissipation part overlapping the second non-folding region; and
a third heat dissipation part overlapping the folding region,
wherein in a second direction crossing the first direction, a width of the third heat dissipation part is smaller than a width of each of the first and second heat dissipation parts.

22. The display device of claim 21, further comprising a second step compensation layer overlapping the folding region, and disposed around the third heat dissipation part between the first heat dissipation part and the second heat dissipation part.

23. An electronic device comprising:
a display device in which a first hole region through which an optical signal passes is defined;
an electronic optical module which is disposed on the display device, overlaps the first hole region, and receives the optical signal; and
a case for receiving the display device and the electronic optical module,
wherein the display device includes:
 a display module including a first non-folding region, a folding region, and a second non-folding region arranged in a first direction;
 a first support plate disposed on the display module;
 a second support plate disposed on the first support plate;
 a heat dissipation layer disposed between the first and second support plates, and including a bending portion overlapping the folding region;
 a first adhesive layer disposed between the first support plate and the heat dissipation layer; and
 a second adhesive layer disposed between the second support plate and the heat dissipation layer,
wherein an opening defined in each of the first and second adhesive layers has a width greater than a width of the bending portion of the heat dissipation layer in the first direction and in a portion overlapping the folding region, and
the bending portion protrudes toward the second support plate so that the bending portion is closer to the second support plate than a surface of the second adhesive layer facing the second support plate is to the second support plate.

24. An electronic device comprising:
a display device in which a first hole region through which an optical signal passes is defined;
an electronic optical module which is disposed on the display device, overlaps the first hole region, and receives the optical signal; and
a case for receiving the display device and the electronic optical module,
wherein the display device includes:
 a display module including a first non-folding region, a folding region, and a second non-folding region arranged in a first direction;
 a first support plate disposed on the display module;
 a second support plate disposed on the first support plate;
 a heat dissipation layer disposed between the first and second support plates;
 a first adhesive layer disposed between the first support plate and the heat dissipation layer, and defining an open portion overlapping the folding region;
 a second adhesive layer disposed between the second support plate and the heat dissipation layer, and defining an open portion overlapping the folding region; and
 a first step compensation layer overlapping the folding region, and disposed between the heat dissipation layer and the first support plate in a portion in which the first adhesive layer is open,
wherein an opening defined in each of the first and second adhesive layers has a width greater than a width of the bending portion of the heat dissipation layer in the first direction and in a portion overlapping the folding region, and
the bending portion protrudes toward the second support plate so that the bending portion is closer to the second support plate than a surface of the second adhesive layer facing the second support plate is to the second support plate.

* * * * *